United States Patent [19]
Yasui et al.

[11] Patent Number: 5,010,725
[45] Date of Patent: Apr. 30, 1991

[54] SYSTEM FOR TRANSPORTING ROVING BOBBINS BETWEEN ROVING AND SPINNING PROCESSES

[75] Inventors: Yoshiharu Yasui; Katsumi Nakane; Osamu Suzuki; Masahiko Kimbara, all of Kariya, Japan

[73] Assignees: Kabushiki Kaisha Toyoda Jidoshokki Seisakusho; Nisshinbo Industries, Inc., both of Tokyo, Japan

[21] Appl. No.: 530,462

[22] Filed: May 29, 1990

Related U.S. Application Data

[63] Continuation of Ser. No. 241,696, Sep. 7, 1988, abandoned.

[30] Foreign Application Priority Data

Sep. 12, 1987 [JP] Japan .................................. 62-229187

[51] Int. Cl.$^5$ .............................................. D01H 9/18
[52] U.S. Cl. ........................................... 57/281; 57/90
[58] Field of Search .................. 57/266, 267, 268, 281, 57/90

[56] References Cited

U.S. PATENT DOCUMENTS

| | | | |
|---|---|---|---|
| 3,828,682 | 8/1974 | Klein | 57/281 X |
| 4,023,339 | 5/1977 | Laderach et al. | 57/281 X |
| 4,144,961 | 3/1979 | Kasahara et al. | 57/281 X |
| 4,473,997 | 10/1984 | Kawasaki et al. | 57/281 X |
| 4,720,967 | 1/1988 | Guttler | 57/266 X |

FOREIGN PATENT DOCUMENTS 49412 10/1986 Japan ................................. 57/266

Primary Examiner—Joseph J. Hail, III
Attorney, Agent, or Firm—Burgess, Ryan & Wayne

[57] ABSTRACT

A system for transporting roving bobbins in a cyclic manner between roving frames (1), spinning frames (2) and a residual roving clear-off process, in which the roving bobbins are transported by a carrier (7) driven by a tractor (14) along a main rail (3) arranged to form an endless loop and working rails (4, 5, 6) branched from the main rail (3). Dogs (28, 29, 30) for representing the respective frame address or the respective working rail address are disposed on the main rail (3) and detected by a sensor (34, 35, 36) mounted on the tractor (14). A station (68, 69, 70) is disposed in the inlet area of the roving and spinning processes for transmitting a command issued from a central control unit (71) supervising the system to the tractor (14). The command is prepared in accordance with information regarding the conditions of the tractor (14) and of the respective frames (1, 2) and working rails (4, 5, 6) and includes information regarding the frame address and/or the working rail address requiring the transportation of a carrier (7).

5 Claims, 24 Drawing Sheets

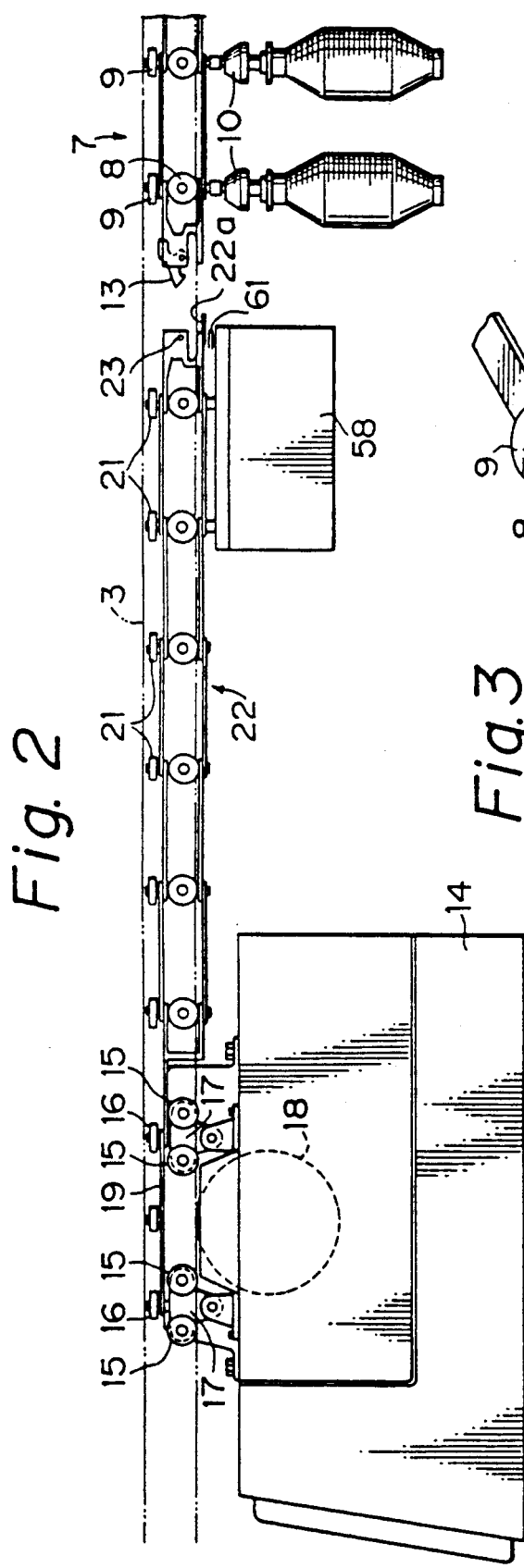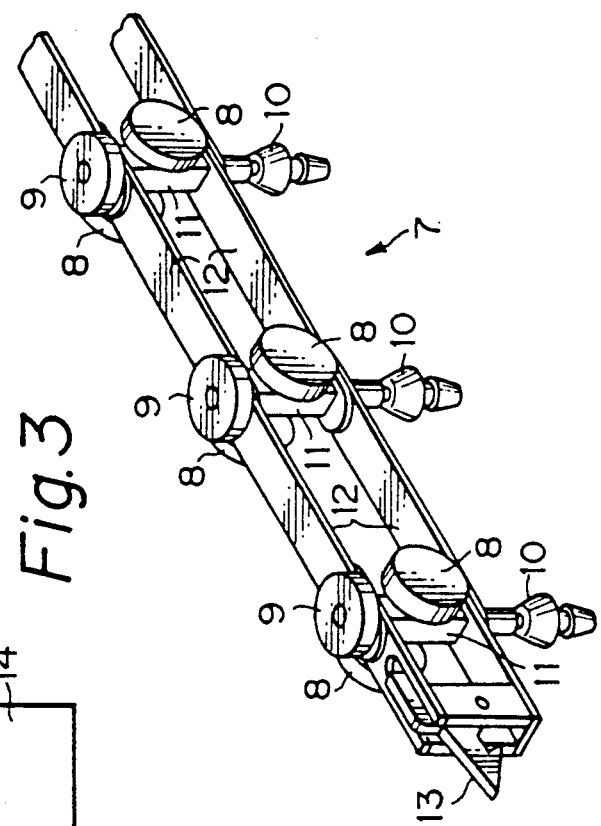

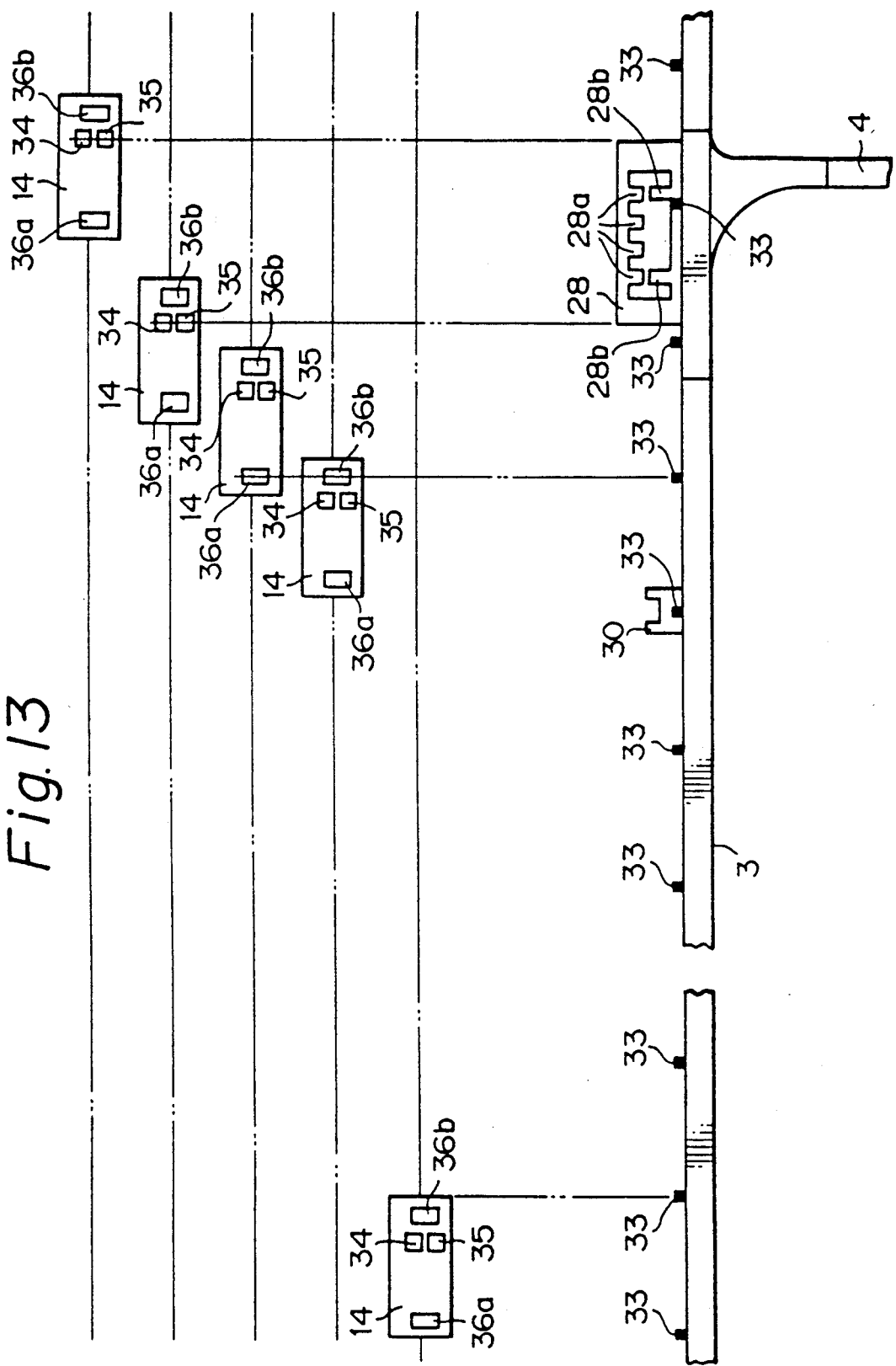

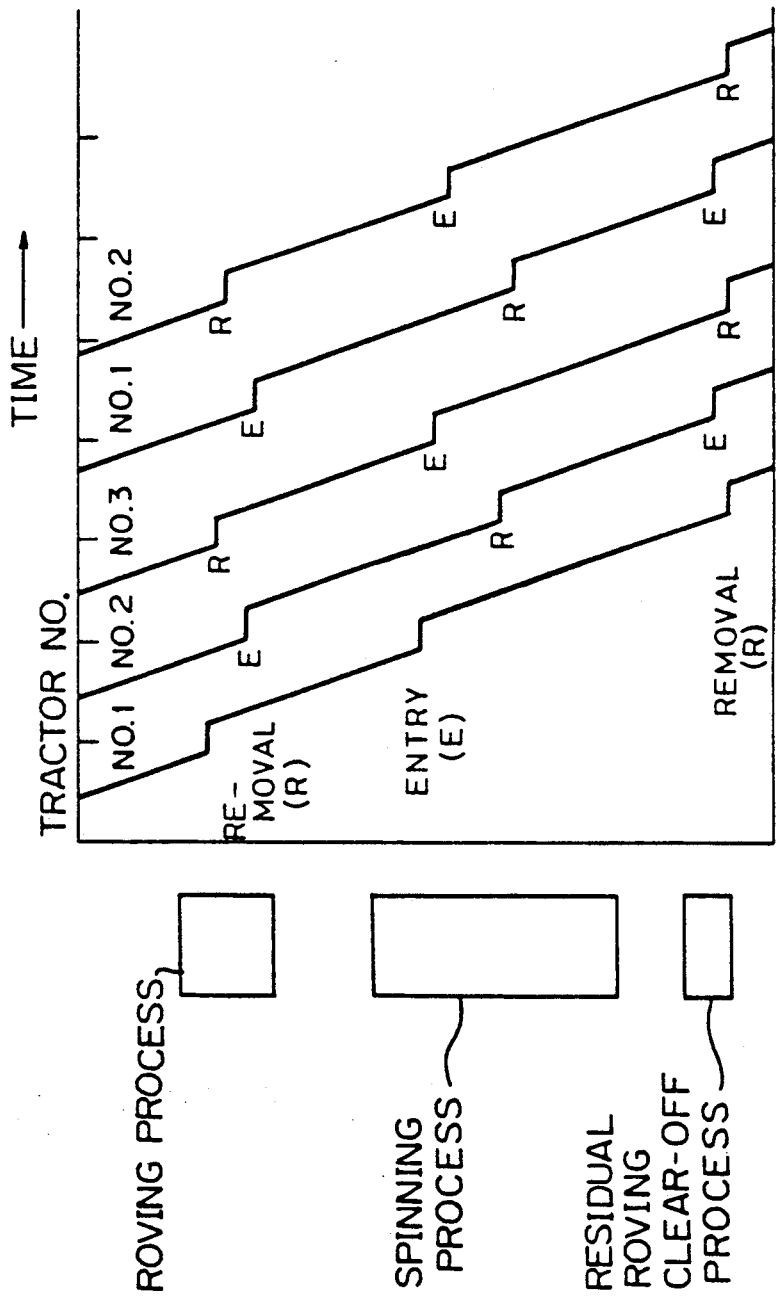

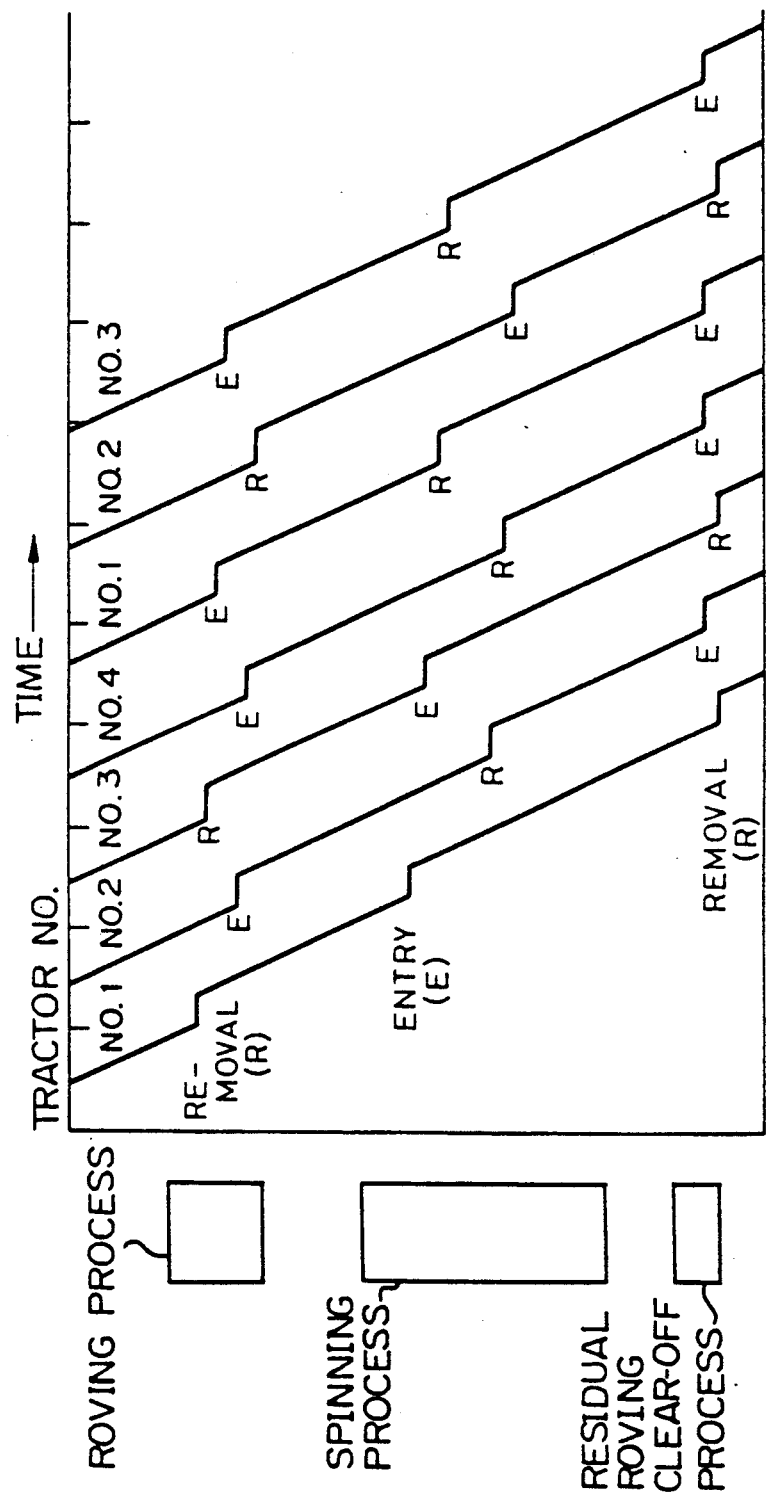

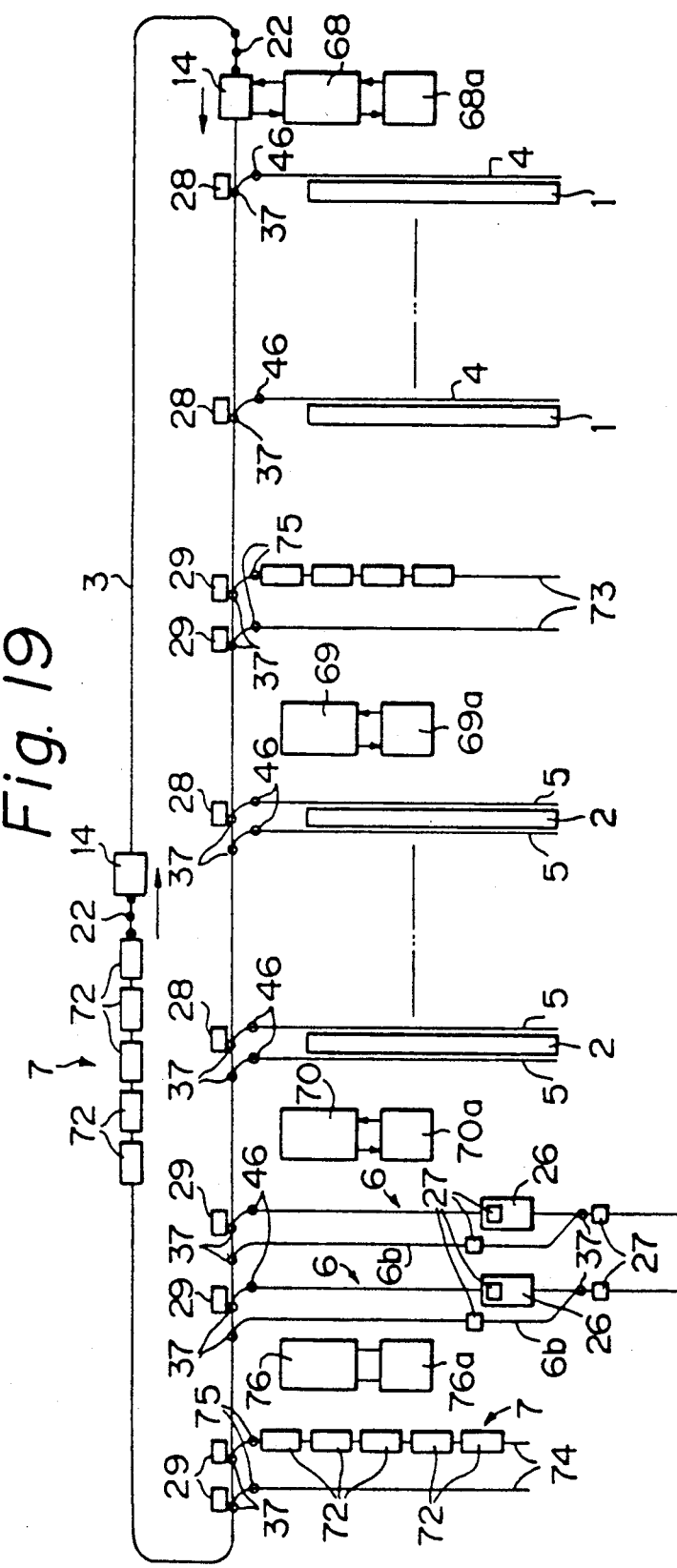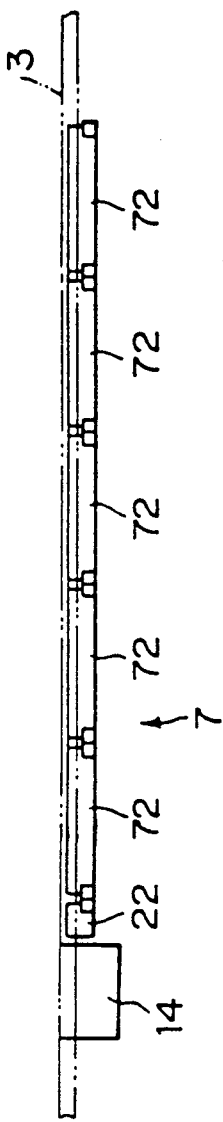

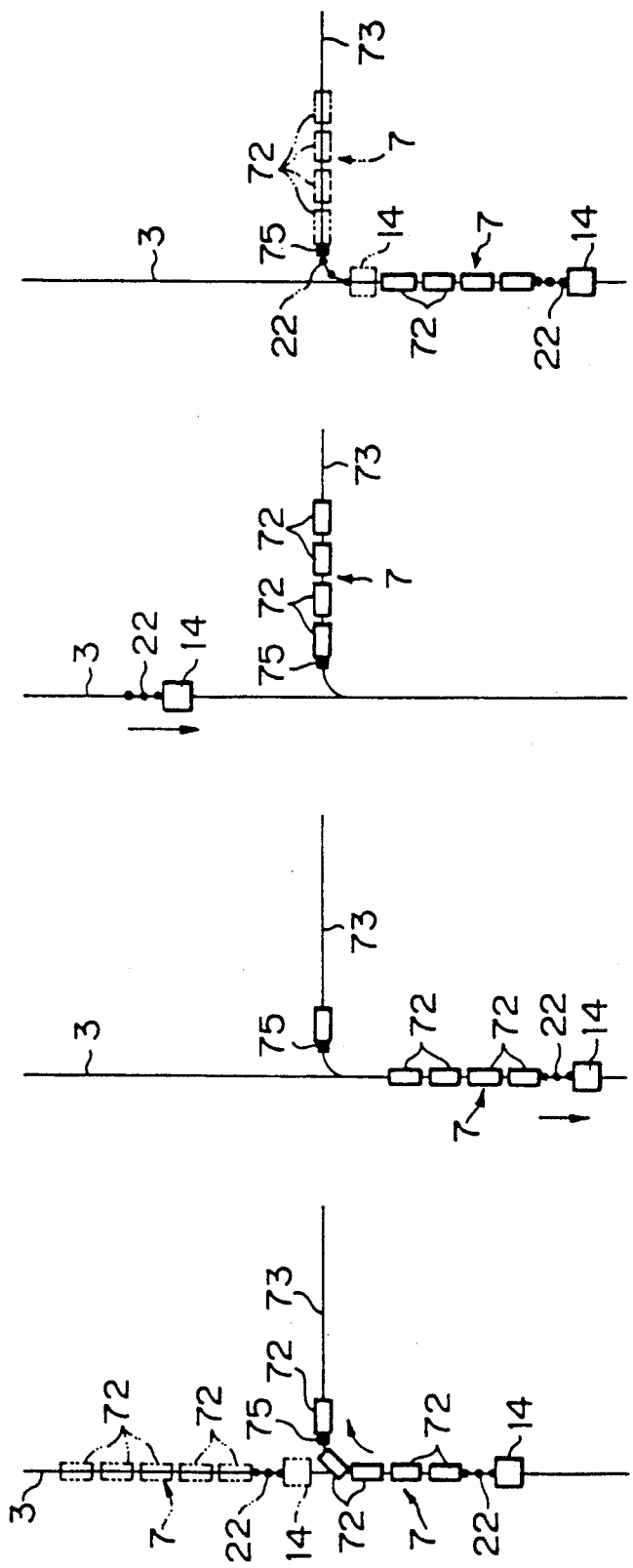

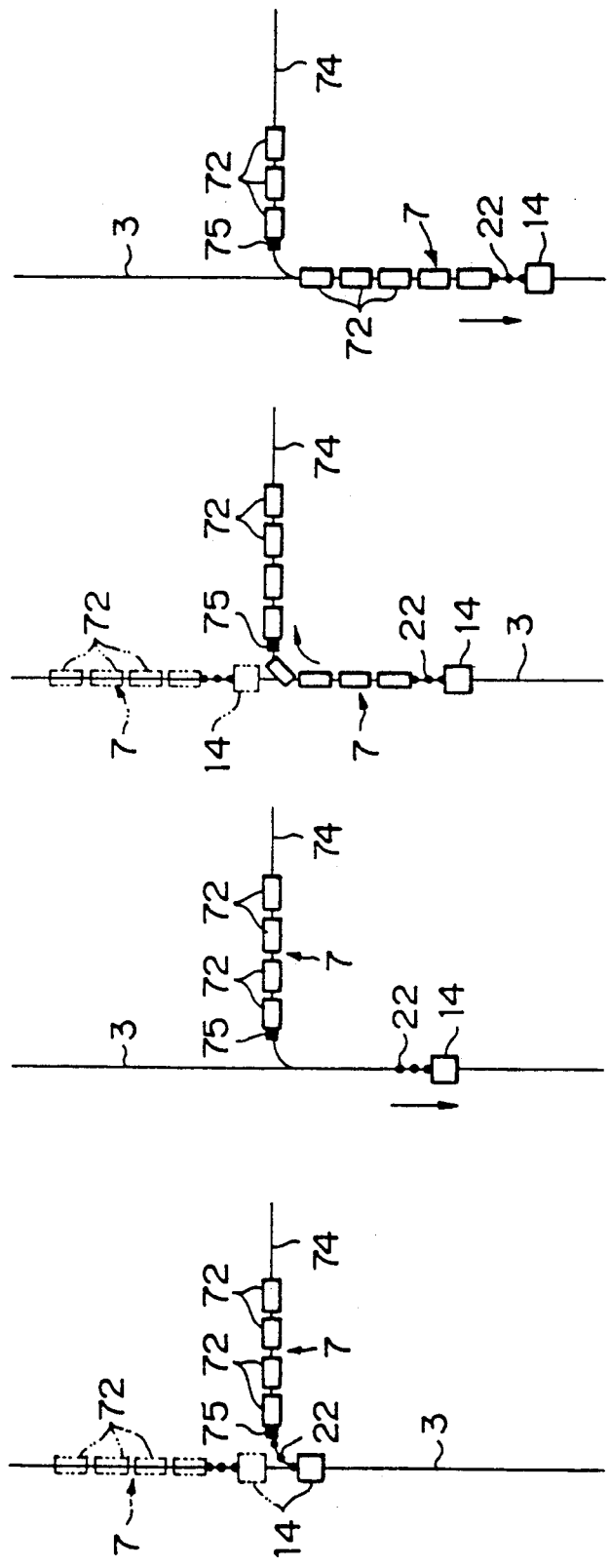

SYSTEM FOR TRANSPORTING ROVING BOBBINS BETWEEN ROVING AND SPINNING PROCESSES

This application is a continuation of application Ser. No. 241,696, filed Sept. 7, 1988, now abandoned.

BACKGROUND OF THE INVENTION

1. Field of the Invention

The present invention relates to a system for transporting roving bobbins between a roving process and a spinning process while suspended from a carrier pulled by a tractor along a main rail and working rails arranged between a roving process and a spinning process. In particular, it relates to a system for transporting roving bobbins and suitable for a spinning system comprising a plurality of roving frames and a plurality of spinning frames and spinning at least two types of yarn.

2. Description of the Related Arts

One known such system is disclosed in Japanese Examined Patent Publication (Kokoku) No. 55-36731. As shown by FIG. 23, three roving frames A, B, and C, each corresponding to three spinning frames a, a, a; b, b, b; and c, c, c, are arranged so that three groups are formed.

SUMMARY OF THE INVENTION

An object of the present invention is to eliminate the above drawbacks of the conventional roving bobbin transporting system.

Another object of the present invention is to provide an improved roving bobbin transporting system, in which control of the tractor movement is more flexible, and thus more effective.

According to the present invention, the above objects are attained by a system for transporting roving bobbins in a cyclic manner between a roving process, a spinning process, and a residual roving clear-off process, in which the roving bobbins are transported, while suspended from a carrier, along a main rail arranged to form an endless loop, and working rails branched from the main rail, such as a roving frame rail, a spinning frame rail, or a residual roving clear-off rail, the carrier being detachably connected to a tractor and driven thereby, characterized in that a means representing the respective frame address or the respective working rail address is arranged on the main rail, and is detected by a sensor mounted on the tractor; and a station is arranged at least in the inlet areas of the roving and spinning processes, respectively, for transmitting a command issued from a central control unit supervising the system to the tractor, this command being compiled in accordance with information received regarding the conditions of the tractor and of the respective frames and working rails and including information containing the frame address and/or the working rail address to which the carrier should be transported.

Preferably, the carrier is moved on and off the working rail by backward and forward movements, respectively, of the tractor along the main rail.

Advantageously, the backward and forward movements of the tractor are controlled so that the tractor runs predetermined distance from a division point between the main rail and the working rail, this distance being defined by address dogs arranged at a pitch on the main rail.

Preferably, the tractor moves the carrier on or off the working rail only once each time of passing the respective processes.

Advantageously, the residual roving clear-off rail comprises a pair of rails; an entry rail and an exit rail; the entry rail having an inlet opening onto the main rail for moving the carrier onto the main rail and the exit rail having an outlet opening onto the main rail for moving the carrier off of the main rail, whereby the carrier having empty roving bobbins which have been cleared off the residual roving can be held on the exit rail without hindering the movement of an arriving carrier on the entry rail.

BRIEF DESCRIPTION OF THE DRAWINGS

The other objects and further advantages of the present invention will be more apparent from the following description with reference to the drawings illustrating the preferred embodiments of the present invention, wherein:

FIGS. 1 through 18 show a first embodiment of the present invention; wherein,

FIG. 1 is a diagrammatic plan view illustrating one layout of a transporting system according to the present invention;

FIG. 2 is a side view of a tractor;

FIG. 3 is a perspective view of part of a carrier;

FIG. 4 is a plan view of a main rail illustrating the arrangement of address dogs;

FIG. 6 is a diagrammatic plan view illustrating the arrangement of sensors mounted on the tractor;

FIG. 7 is a plan view of a switching mechanism for connecting and disconnecting a working rail to a main rail;

FIG. 10 is a plan view of a mechanism for releasing the connection of the carrier disposed on a working rail for a spinning frame;

FIG. 13 is a diagram illustrating the operation of the tractor for detecting address dogs;

FIGS. 18(a) to 18(b) are examples of a working schedule of the tractors;

FIGS. 19 to 22 show a second embodiment of the present invention;

FIG. 19 is a diagrammatic plan view illustrating a layout, other than that shown in FIG. 1, of the transporting system according to the present invention;

FIG. 20 is a diagrammatic side view of a carrier;

FIGS. 21(a) to 21(d) are plan views illustrating the steps of rearranging a formation of a carrier of full roving bobbins;

FIGS. 22(a) to 22(d) are plan views illustrating the steps of rearranging a formation of a carrier of empty roving, bobbins; and, FIG. 23 is a diagrammatic plan view illustrating a conventional system for transporting roving bobbins.

DESCRIPTION OF THE PREFERRED EMBODIMENTS

First Embodiment

Figure 1:
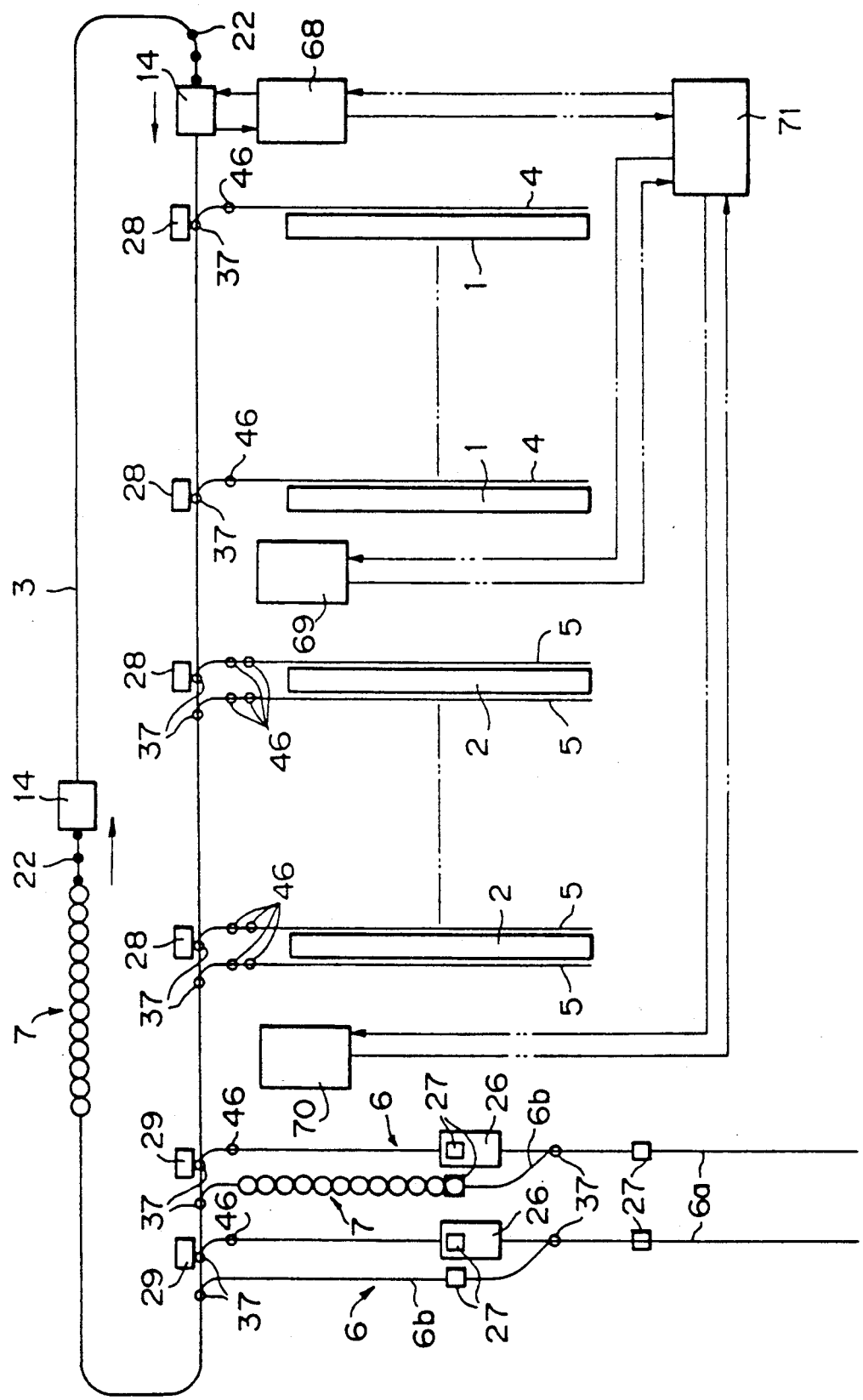

A first embodiment of the present invention which can be applied to a spinning system producing two types of yarn, will be described with reference to FIGS. 1 to 18. As shown in FIG. 1, a group of roving frames 1 arranged in parallel to each other and a group of spinning frames 2 arranged in parallel to each other are connected by a main rail 3 in the form of a loop and suspended from a ceiling of a factory building. A working rail 4 is arranged in front of each roving frame and a pair of working rails 5 are arranged on either side of each spinning frame, for holding the roving bobbins. The working rails 4 and 5 are branched from the main rail 3. Further, a pair of working rails 6 are arranged in parallel to each other between the spinning process and the roving process, for clearing off a residual roving on a roving bobbin exhausted in a spinning frame. The rails 3, 4, 5, and 6 have a U-shaped cross-section, and a carrier 7 suspending roving bobbins is movable thereon.

Figure 12A:
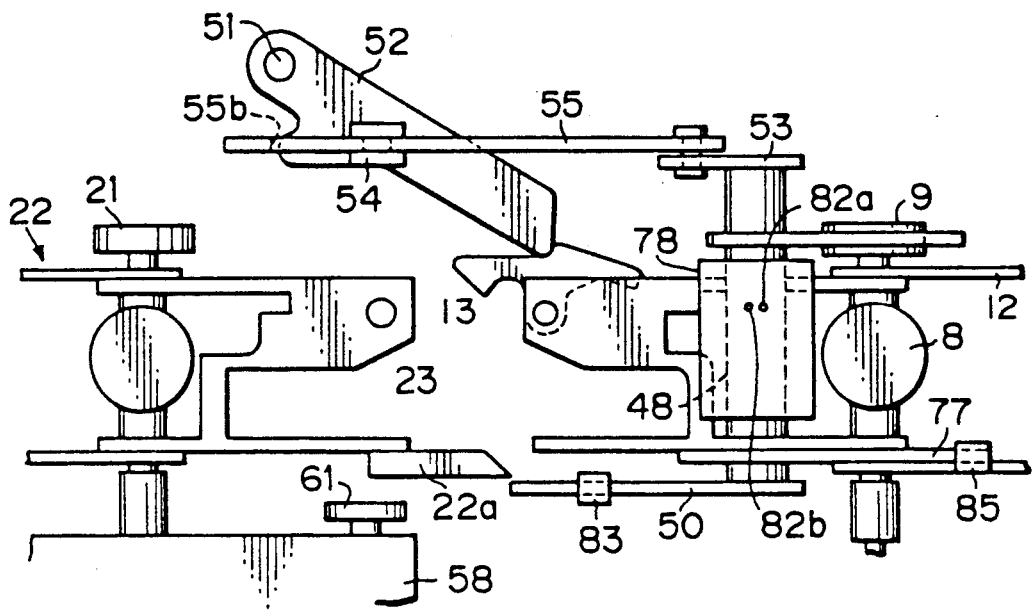
FIGS. 12(a) and (b) are side views illustrating the relationship between the releasing mechanism and the connection.

With reference to FIG. 3, the carrier 7 comprises a plurality of support members 11 connected to each other by links 12. Each support member 11 has a pair of rollers 8 on either side thereof, a roller 9 on the top thereof, and a hanger 10 suspended from the bottom thereof. The carrier 7 has a hook 13 at the front end thereof for connection to a tractor. As shown in FIG. 2, a tractor 14 is suspended from the main rail 3 by a pair of support members 17, each having two pairs of rollers 15 on either side thereof and a roller 16 on top thereof, and is movable alone, or while pulling the carrier, along the main rail 3 by the rotation of a drive wheel 18 secured between the pair of support members 17 and in contact with the bottom of the main rail 3. The pair of support members 17 are connected to each other through a link 19. The tractor 14 has a chain-like connector 22 at the rear end thereof which comprises a plurality of rollers 21, each connected to the other by a link, and a hooking pin 23 at the rear end thereof and engageable with the hook 13 of the carrier 7, for connection therewith. As illustrated in FIGS. 2 and 12(a), (b), a proximity switch 22a is mounted at the rear end of the connector 22 and acts as a sensor for detecting the connection of the connector 22 and the carrier 7. Namely, when the carrier 7 is connected to the connector 22, the switch 22a issues an ON signal, and when disconnected, issues an OFF signal. This state of the switch 22a is maintained until the tractor 14 reaches a later-described station arranged in the inlet area of the respective process and transmits a signal to the station, thereby informing the station of the condition of the tractor 14 (i.e., whether or not the tractor 14 is pulling a carrier 7).

The working rail 6 for a residual roving clear-off process consists of an entry rail 6a having a length approximately twice as long as the carrier 7 and an exit rail 6b branched from the entry rail 6a. Both rails 6a, 6b have an inlet 24 and an outlet 25 opening onto the main rail 3. A device 26 for clearing off a residual roving on an exhausted roving bobbin of the known structure is provided at a midway point in the entry rail 6a, and a device 27 for driving a carrier is stationarily provided on the entry rail 6a at the same location as the device 26. The position of the device 27 is defined such that a distance from a division point of the main rail 3 to the device 27 is shorter than a total length of the carrier 7 and the connector 22. The exit rail 6b is branched from the entry rail 6a at a position further from the main rail 3 than the device 26, so that the carrier 7 carrying empty bobbins which have been cleared off by the device 26 can be held on the exit rail 6b without hindering the movement of another carrier 7 carrying exhausted roving bobbins onto the entry rail 6a, or the clear-off operation of the device 26. Further, the device 27 for driving a carrier 7 is provided on the entry rail 6a at a position between the main rail 3 and the division point of the rails 6a, 6b. The device 27 is also provided on the exit rail 6b.

Figure 4:
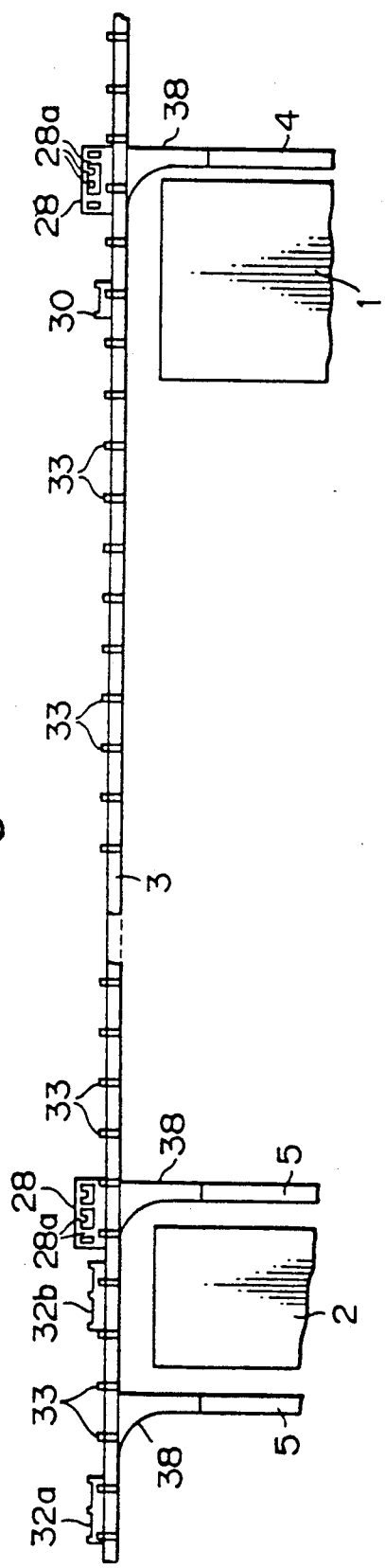
Figure 5C:
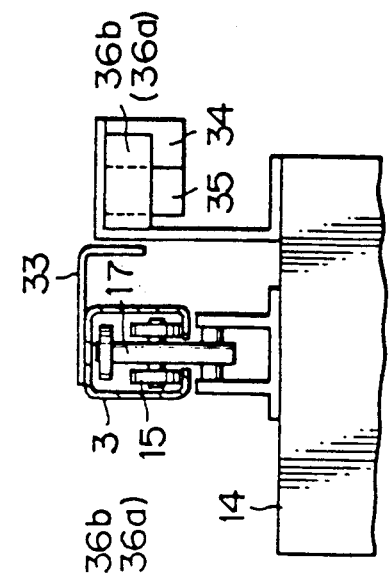
FIGS. 5(a) to 5(c) are sectional views illustrating the shape of respective dog and the mounting of the respective sensors for detecting the dogs.
Figure 5B:
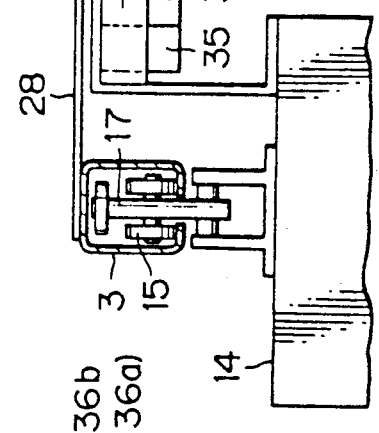
Figure 5A:
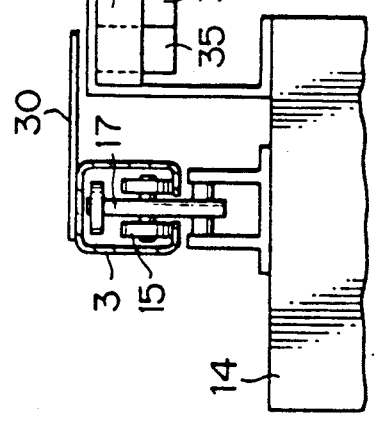
Figure 6:
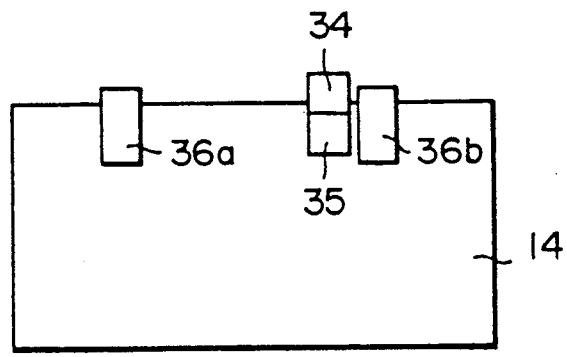
Figure 8A:
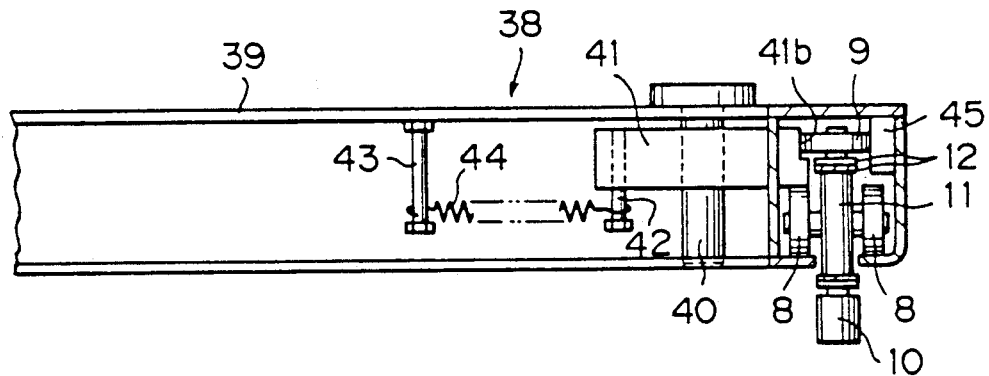
FIG. 8(a) is a section taken along a line X—X of FIG. 7.
Figure 8B:
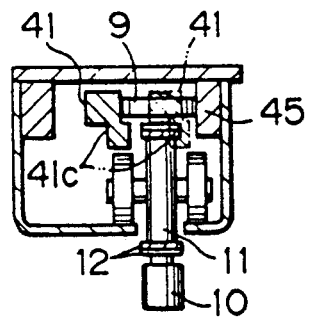
FIG. 8(b) is a section taken along a line Y—Y of FIG. 7.

As shown in FIGS. 4 and 13, dogs 28 for representing an address of the respective roving and spinning frames 1 and 2 and dogs 29 for representing an address of the respective working rail, such as the rail 6, are arranged on the main rail 3 at the division point between the main rail 3 and the working rail. Dogs 30, 32a, and 32b are arranged on the main rail 3, respectively, at a position apart from the dogs 28 and 29 in the running direction of the tractor 14, for representing a stop position of the tractor 14. Other dogs 33 for detecting a running distance of the tractor 14 are arranged at a pitch from each other along the main rail 3. This pitch is defined as less than half a minimum distance between the respective adjacent division points. The tractor 14 is provided with a pair of address sensors 34, 35 for detecting the dogs 28, 29, to determine the frame address and the working rail address. The sensors 34, 35 also detect the dogs 30, 32a and 32b to determine a stop position of the tractor. The tractor 14 is also provided with a pair of sensors 36a, 36b for counting the dogs 33 to determine the running distance of the tractor. The sensors 34, 35, 36a and 36b are preferably proximity switches. The dogs 30, 32a and 32b for representing a stop position of the tractor and the dogs 28 and 29 for representing the frame address and the working rail address are fixed in the horizontal plane relative to the main rail 3, as shown in FIGS. 5(a), and (b), and the address sensors 34, 35 are fixed in the vertical plane thereto. The dog 28 for representing the frame address has a plurality of detecting points 28a arranged at a predetermined pitch and detectable by the address sensor 34, as shown in FIGS. 4 and 13. On the opposite side of the dog 28, a plurality of further detecting points 28b, positioned at points corresponding to the related frame address, are provided at positions detectable by the sensor 35. According to this structure, the pair of sensors 34 and 35 scan the dog 28 as the tractor moves along the main rail 3. When the sensor 34 detects the point 28a, an ON signal is issued therefrom, and accordingly, the sensor 35 issues ON and OFF signals, respectively, corresponding to the detection and non-detection of the point 28b, so that the frame address is represented by a series of binary codes each necessarily including at least one ON signal issued from the sensor 34. Also, the dog 29 representing the working rail address has a similar structure and is readable in the same way as above.

The dogs 30, 32a, and 32b for determining a stop position of the tractor 14 have detecting points similar to the point 28b but lack the other detecting points similar to the point 28a, so that the sensor 34 always issues an OFF signal when reading these dogs, and thus a series of binary codes are obtained by the pair of sensors 34, 35, each necessarily including at least one OFF signal issued from the sensor 34. The dog 33 for determining a running distance of the tractor 14 is formed by a plate having an L-shaped side section, as shown in FIG. 5(c), and the sensors 36a and 36b are mounted on the tractor 14 on a horizontal plane so that the downwardly bent portion of the dog 33 can be detected thereby.

Figure 7:
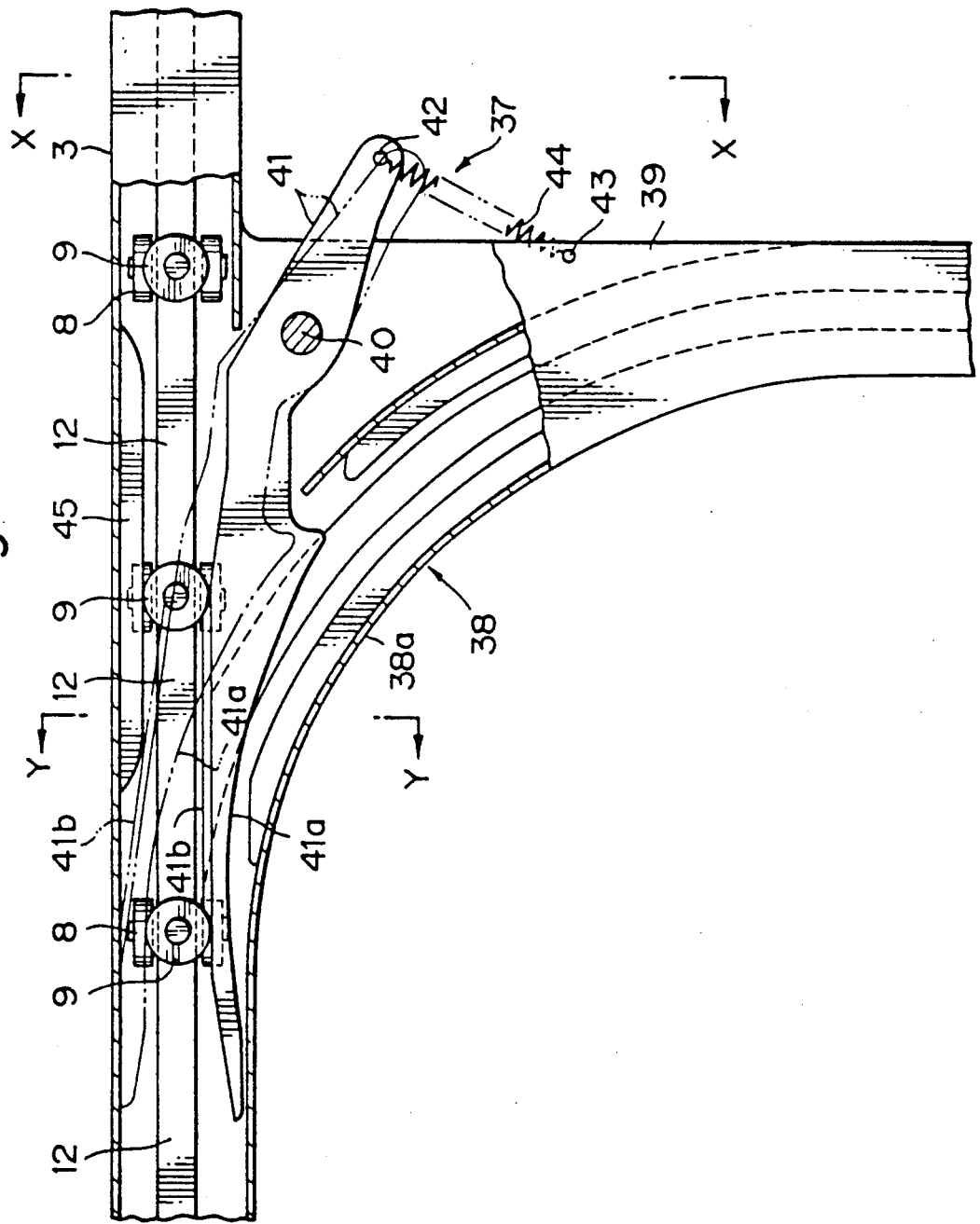

A rail switching mechanism 37 is provided at the respective division points between the main rail 3 and the working rails 4, 5 and 6 as well as those between the entry rail 6a and the exit rail 6b. As illustrated in FIG. 7, a curved rail 38 arranged in the branched area has a rail body fixed at a predetermined position and supporting the rollers 8 of the carrier 7 and the rollers 15 of the tractor 14. A pin 40 is vertically secured on an upper plate 39 and pivotably supports a lever 41 at the base end are thereof. The lever 41 serves to guide the carrier 7, the tractor 14 and the connector 22 by engaging simultaneously with the adjacent two rollers 9, 16 or 21 of the carrier 7, etc. The lever 41 can reciprocate within the inside of the curved rail 38 and selectively occupy either of two positions; a blocking position in which the carrier 7 is prevented from entering a branch section 38a, or an admittance position in which the carrier 7 is allowed to enter the branch section 38a. The lever 41 is always biased toward the admittance position, shown by a chain line in FIG. 7, by a spring 44 stretched between a hook 42 projected from the base end of the lever 41 and an other hook 43 projected from the upper plate 39 of the curved rail 38. The lever 41 has an arcuate side surface 41a for smoothly guiding the rollers 9, 21 of the carrier 7 and the connector 22 running along the branch section 38a when the lever 41 is in the admittance position. The lever 41 also has an opposite side surface 41b for engaging with and guiding the rollers 16, 21 and 9 of the tractor 14, connector 22, and carrier 7 when the lever 41 is in the blocking position. The opposite side surface 41b has a linear portion having a length such that it is simultaneously engageable with the adjacent two rollers 9, etc., when the lever 41 is in the blocking position. The surface 41b also has a curved portion formed in accordance with a sine curve, which serves to mitigate shock when the lever 41 in the blocking position is pivoted by the rollers 9, etc., and moved to the admittance position. In addition, the lever 41 is adapted to guide the upper surface of the rollers 8 of the carrier 7 running on the main rail 3 by the lower surface thereof, to prevent tilting of the carrier 7. To further enhance the prevention of tilting of the carrier 7, a member 45 is fixed inside of the main rail 3 and confronting the lever 41 at a position engageable with the rollers 9, 16 and 21. The lever 41 is also provided with a guide portion 41c (see FIG. 8(b)) for smoothly guiding a tail end of the connector 22 into the branch section 38a when the tractor 14 without a carrier runs backward to connect an engaging pin 23 thereof with a hook 13 of a carrier 7 waiting on a working rail.

Figure 9A:
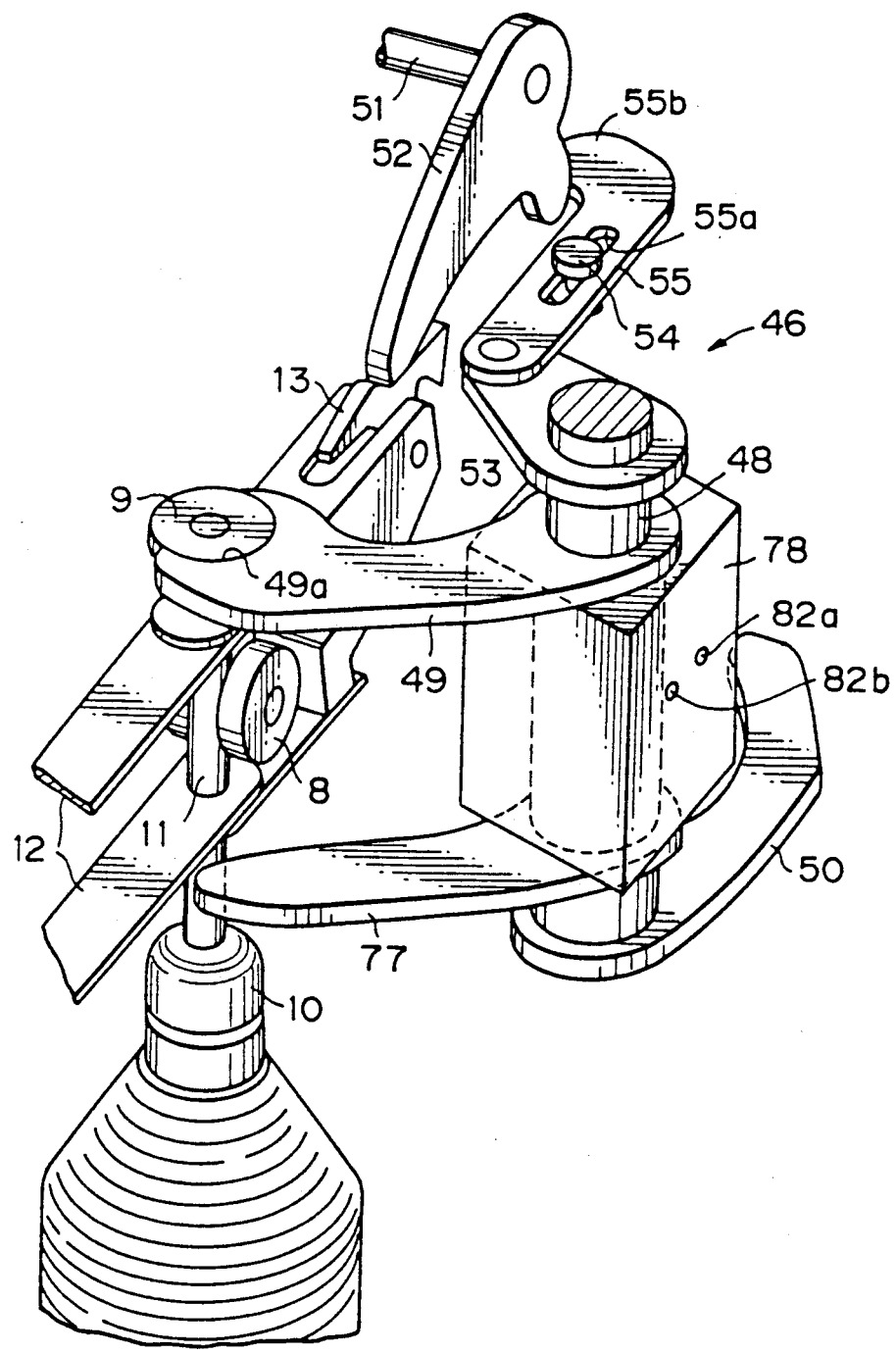
FIG. 9(a) is a perspective view of a mechanism for releasing the connection of the carrier.
Figure 9B:
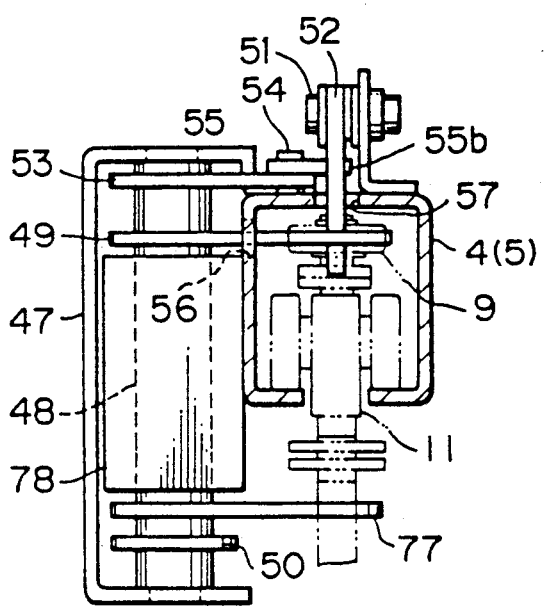
FIG. 9(b) is a front view of the releasing mechanism.
Figure 9D:
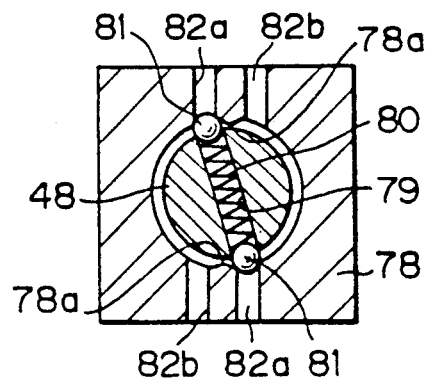
FIG. 9(d) shows a section of a rotary shaft of the mechanism shown in FIG. 9(a)
Figure 14A:
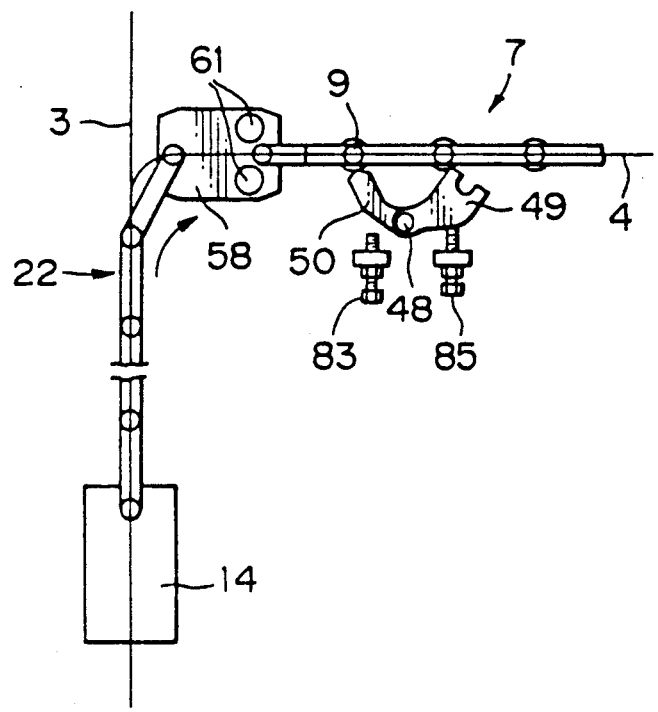
FIGS. 14(a) to 14(d) are plan views illustrating the steps for moving the carrier onto a working rail for a roving frame, respectively.

The respective working rails 4, 5 and 6, respectively, have a releasing device 46, at a position close to the branch section, for detaching the connection between the carrier 7 and the connector 22 and holding the carrier 7 at a predetermined position. A shaft 48 is vertically held beside the working rails 4, 5, and 6 by a bracket 47 fixed to the rail, as illustrated in FIG. 9(b). A positioning lever 49 having a recess 49a engageable with the roller 9 of the carrier 7 is integrally and horizontally secured to the upper portion of the shaft 48. On the other hand, two levers 50 and 77 are integrally and horizontally secured to the lower portion of the shaft 48 so that the levers 50 and 77 are positioned at a level beneath the lower side of the rail. The positioning lever 49 is selectively moved to either of two positions by the action of the lever 50; an engaging position in which the lever 49 is pivoted to engage with the roller 9 at the recess 49a, and a withdrawn position at which the roller 9 is detached from the recess 49a, as shown in FIGS. 9(a) and 9(b). The shaft 48 is rotatably inserted into a central hole of a block 78 fixed to the working rail 4 or 5 and has a diametrical transverse aperture 79 in the middle portion thereof. In the aperture 79 are accommodated a pair of steel balls 81, which are biased toward the inner wall of the block 78 by a spring 80, as shown in FIGS. 9(b) and 9(d). The block 78 has an aperture 82a transverse to the shaft 48 and engageable with the steel ball 81 when the positioning lever 49 is in the engaging position as shown FIGS. 9(c) and 14(d), and has another transverse aperture 82b engageable with the steel ball 81 when the positioning lever 49 is in a position clockwise apart from the withdrawn position, as shown in FIGS. 14(a), (b) and (c). Between the openings of the apertures 82a and 82b in the inner wall of the block 78 is formed a bulge 78a having a triangular cross-section, so that the steel ball 81 is urged to rotate clockwise by the spring 80, steel ball 81, and bulge 78a to engage with the aperture 82b when the shaft 48 is made to rotate from a position shown in FIG. 9(d) to a position at which the steel ball 81 exceeds the peak of the bulge 78a.

Figure 9C:
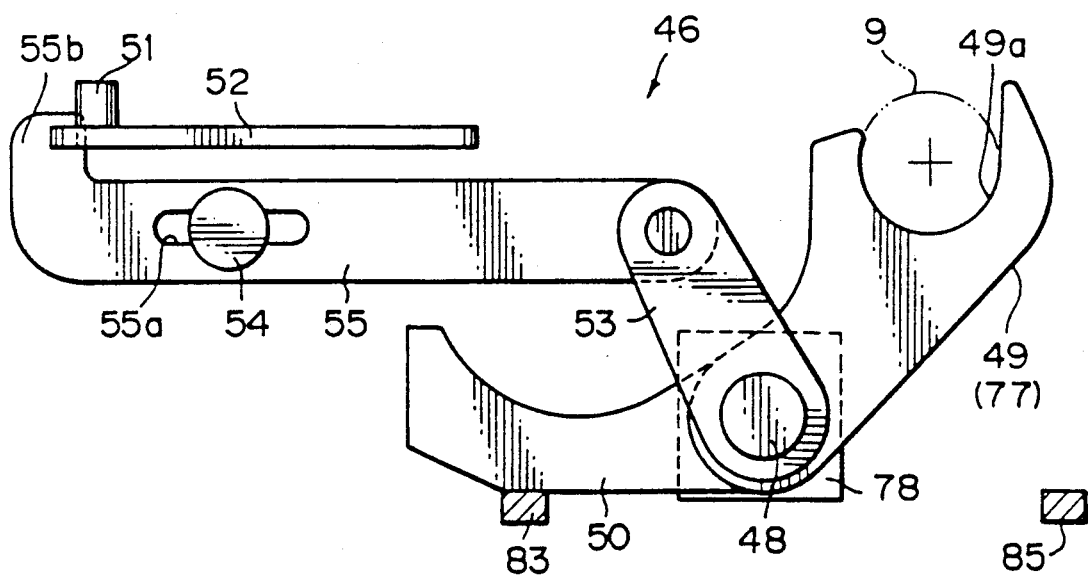
FIG. 9(c) is a plan view of FIG. 9(a)
Figure 14B:
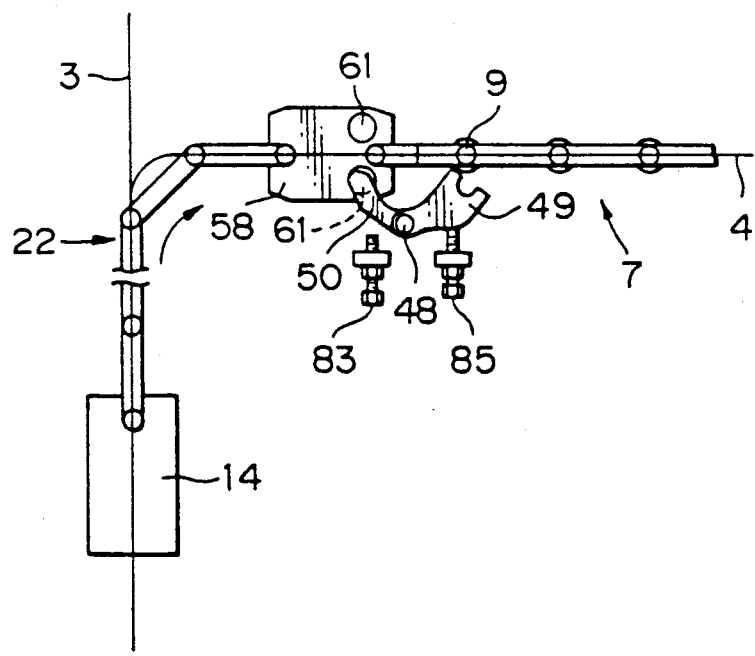
Figure 14C:
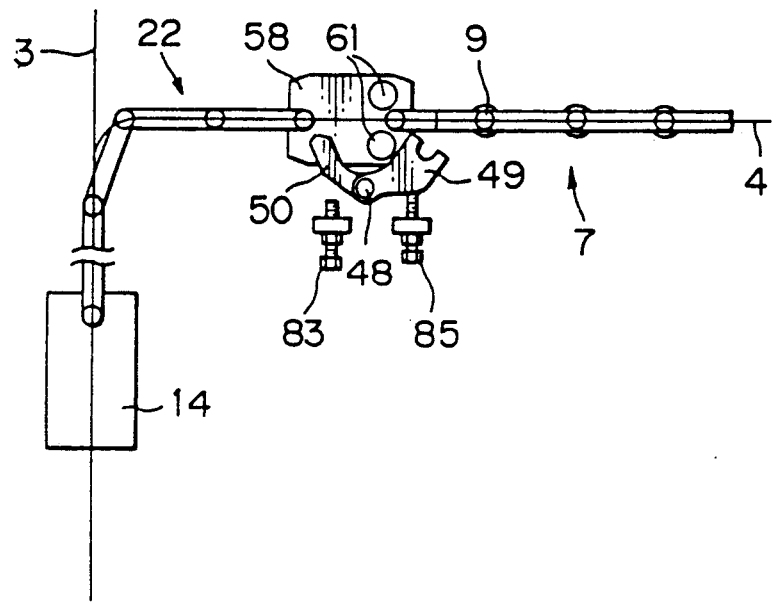

A stop 83 is disposed beside the rail 4 or 5 for abutting the lever 50, as shown in FIG. 9(c), and preventing the positioning lever 49 from rotating further from the engaging position in the counter-clockwise direction. Also, a stop 85 is arranged beside the rail 4 or 5 for abutting the lever 77 and preventing the positioning lever 49 from rotating further from the withdrawn position in the clockwise direction, as shown in FIGS. 14(a) and 14(b).

A biasing device is arranged on the respective working rails 4 and 5 on the outer end side of the roving frame 1 and the spinning frame 2, for holding the carrier 7, with the assistance of the positioning lever 49, at a predetermined position on the rail 4 or 5, so that a doffing operation or a bobbin exchanging operation is not hindered thereby. The biasing device may be of a type shown in FIG. 17(a), in which a catch member 86 engageable with the roller 9 is secured at the front end of a spring 87 extending lengthwise of the working rail 4 or 5. That is, the carrier 7 moved onto the working rail 4 or 5 is held at a predetermined position by the action of the positioning lever 49 and the spring 87. Conversely, if the carrier 7 is moved off of the working rail 4 or 5, the positioning lever 49 is rotated to occupy the withdrawn position at which the lever 77 abuts the stop 85, and is held there.

Figure 17A:
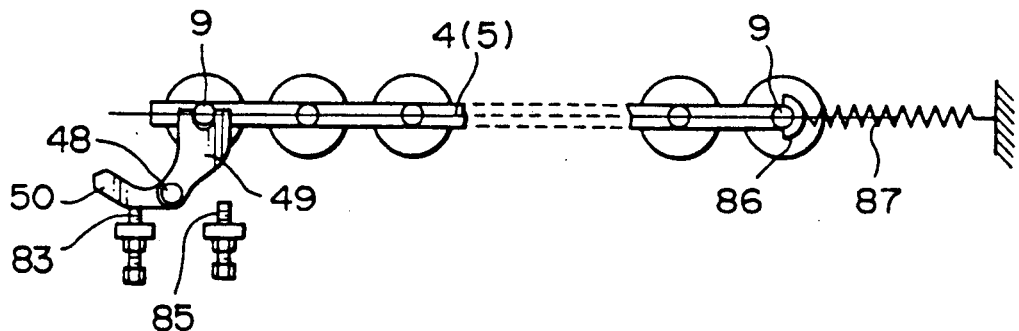
FIGS. 17(a) to 17(d) are diagrammatic plan views illustrating a mechanism for biasing a carrier along a rail and disposed on the outer-end side of a spinning frame or a roving frame, respectively.
Figure 17B:
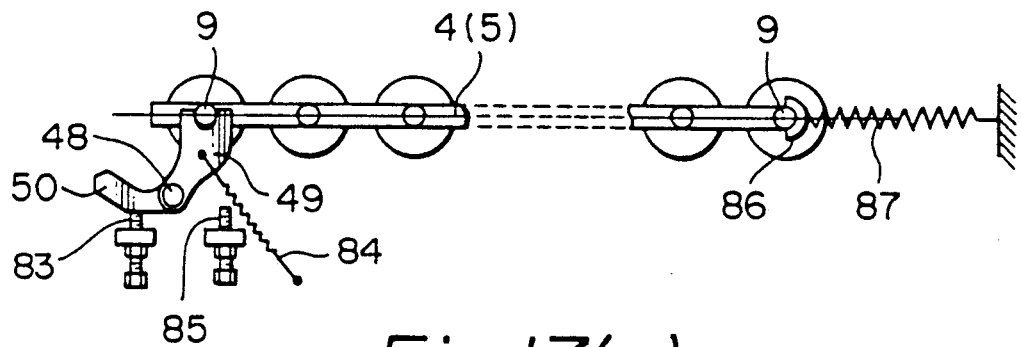
Figure 17C:
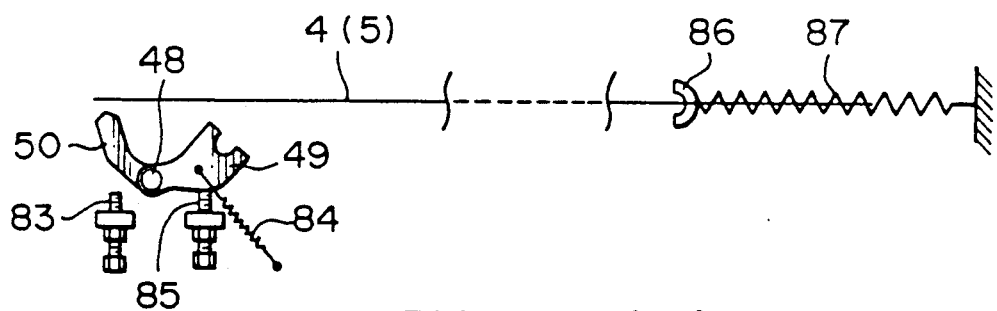
Figure 17D:
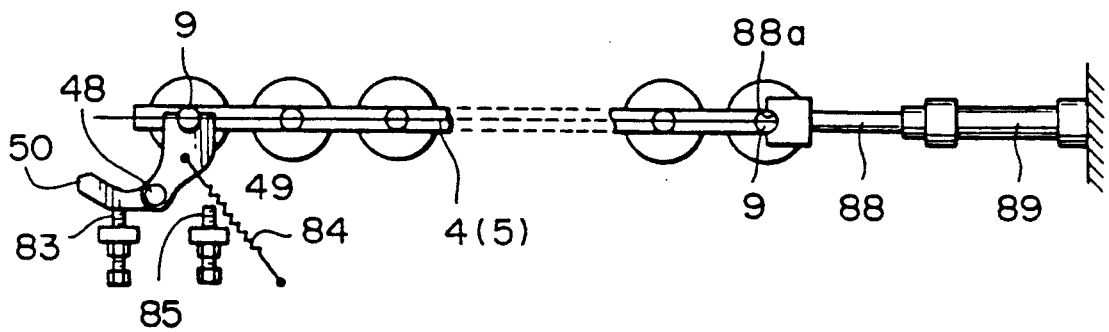
Figure 23:
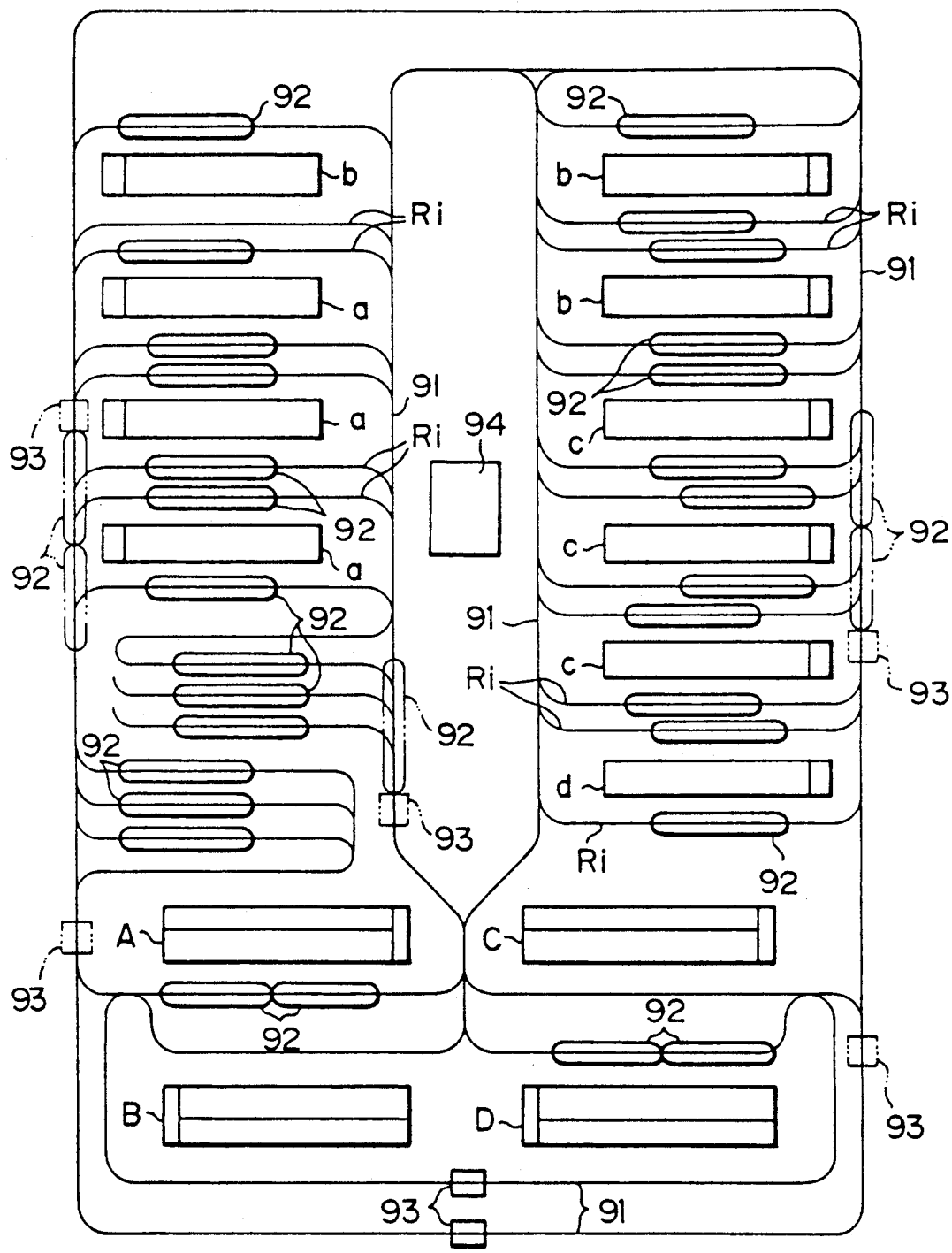

Instead of the above combination of the block 78, spring 80, and steel ball 81, another mechanism may be adopted for holding the positioning lever 49 in the engaging or withdrawn position. As shown in FIGS. 17(b) through 17(d), according to this mechanism, the positioning lever 49 is always urged toward the withdrawn position by a spring 84 having an elastic coefficient smaller than that of the aforesaid spring 87. Stops 83 and 85 are provided beside the working rail 4 or 5 in a similar manner to that described before.

The biasing device may be of a type shown in FIG. 17(d), in which catch member 88a is secured at the front end of a piston rod 88 of a power cylinder 89 extending lengthwise of the working rail 4 or 5. According to this structure, the carrier 7 introduced into the working rail 4 or 5 is held at the predetermined position by the action of the positioning lever 49, spring 87 and cylinder 89. During the removal of the carrier 7, the positioning lever 49 is made to rotate to the withdrawn position as shown in FIG. 17(c) by the action of the spring 84 and held thereby the abutment of the lever 77 with the stop 85. When the carrier 7 is moved onto the working rail 4 or 5 while divided into two parts, the biasing device of the former type comprising the steel ball 81 and the block 78 is preferable.

A horizontal pin 51 is secured above the respective rails transverse there to at a position closer to the main rail 3 relative to the shaft 48. A releasing lever 52 for disconnecting the connection between the carrier 7 and the connector 22 is rotatably mounted on the pin 51 by the base end thereof. A lever 53 is integrally secured at the upper end of the shaft 48 for associating the positioning lever 49 with the releasing lever 52. An actuating lever 55 is mounted on the working rail 4 or 5 in parallel to the releasing lever 52 by the engagement of a guide pin 54 through an elongated hole 55a and connected at the one end thereof to the front end of the lever 53. The lever 55 has a projection 55b, at the other end thereof, engageable with the releasing lever 52. The releasing lever 52 is adapted to detach the engagement thereof with the projection 55b of the actuating lever 55 when the positioning lever 49 is engaged with the roller 9 and to pivot downward due to its own dead weight so as to move the hook 13 of the carrier 7 to the releasing position. The respective working rails have through-holes 56, 57 for allowing the positioning lever 49 and the releasing lever 52 entering into the inside of the rail.

Figure 10:
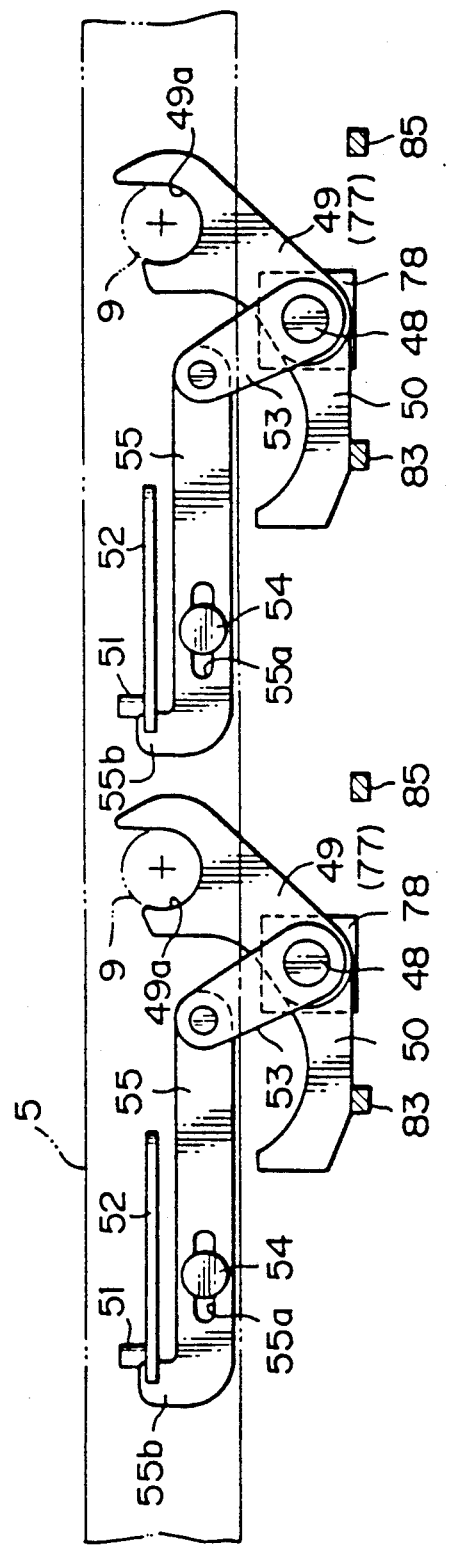

The respective working rails 4 and 6 have only one releasing device 46. However, the respective working rails 5 for a spinning frame have two releasing devices 46, as shown in FIG. 10, to carry out the roving exchanging operation disclosed in DE 35 37727 A1. That is, the two releasing devices 46 are arranged lengthwise of the working rail 5. According to the roving exchanging operation disclosed in the above reference, roving bobbins now producing a yarn on a spinning frame (hereinafter referred to as "producing bobbin") are initially arranged on the bobbin creels of the spinning frame in two rows along the length of the spinning frame. Every row alternately has a full size roving bobbin and a half size roving bobbin, with respect to a length of roving wound thereon, so that the same size bobbin in both rows are adjacent to each other to form one pair. When the half size bobbins become almost empty, the respective pairs of empty bobbins are sequentially removed from the creel and replaced by new full size bobbins on the working rail 5 for a spinning frame by the operation of an automatic roving bobbin exchanger running along the spinning frame from one end to the other end. Thus, all the empty bobbins are replaced by the reserved full bobbins and transferred onto the working rail 5. It is essential to position the row of the reserved full bobbins corresponding to the position of the empty bobbins to be removed. As stated above, since the empty bobbins on the creel are alternated with the half size bobbin when the exchanging operation is carried out, the position of the former varies to and fro by one pitch of the bobbin arrangement in the creel, at each exchanging operation. Corresponding thereto, the stop position of the carrier for carrying the reserved roving bobbins introduced into the working rail 5 must be adjusted every time. To enhance this adjustment, the two releasing devices 46 are arranged at a distance corresponding to one pitch of the support member 11 constituting the carrier 7 in this embodiment.

Figure 11A:
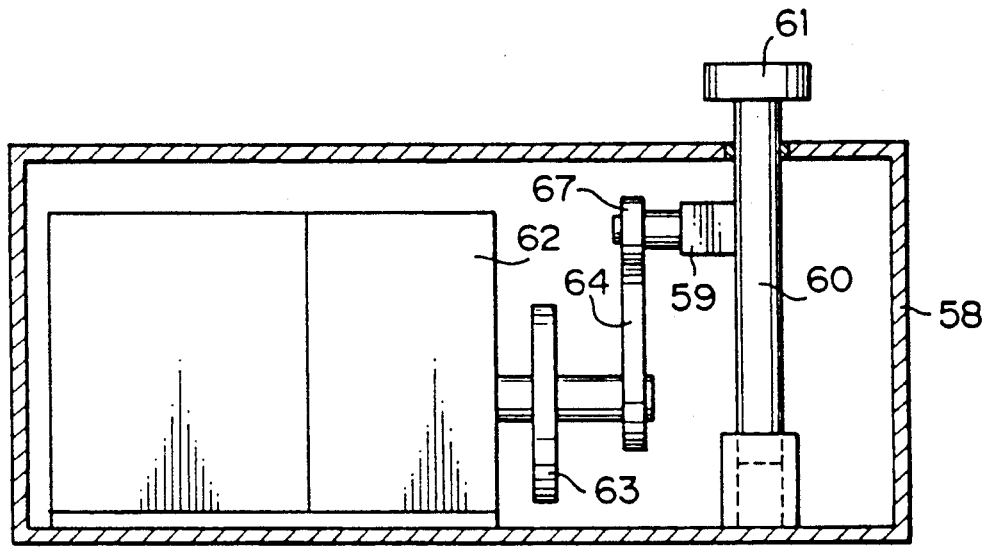
FIGS. 11(a) and (b) show sections of a mechanism for driving rollers.
Figure 11B:
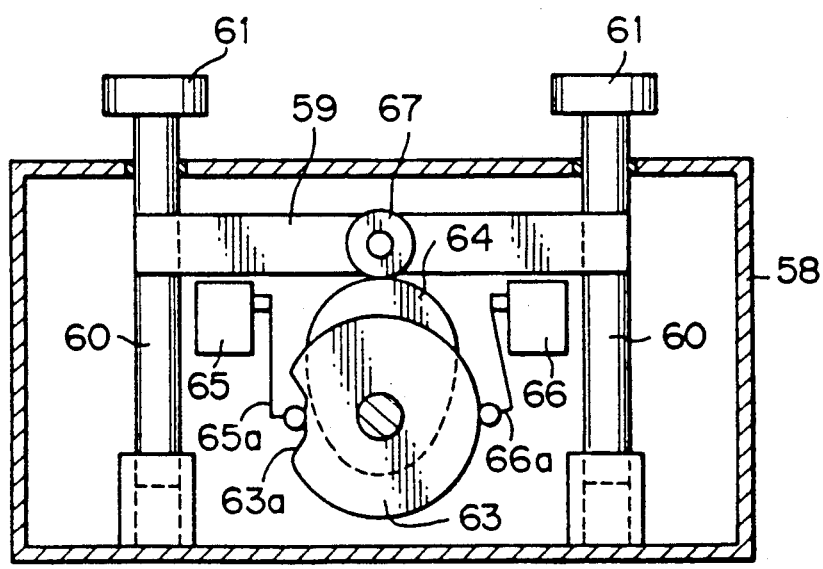

A mechanism for driving the releasing device 46 is provided at the back of the connector 22. As illustrated in FIGS. 11(a) and 11(b), a pair of rods 60 are secured to a casing 58 suspended from the rear portion of the device 46. The rods 60 are fixedly connected to each other by a connecting bar 59 and movable up and down. A roller 61 is rotatably mounted on the upper end of the respective rod 60, for transmitting the motion of the tractor 14 to the lever 50. A geared motor 62 is accommodated in the casing 58 and a pair of cams 63, 64 are fixed to an output shaft of the motor 62. One of cams 63 is formed substantially in a circular disc shape having only one recess 63a on the periphery thereof. A pair of limit switches 65, 66 are arranged symmetrically with each other while intervening the cam 63 therebetween so that the switches 65, 66 are OFF when actuators 65a, 66a correspond to the recess 63a, respectively. Another cam 64 is formed substantially in an oval shape and engaged with a cam follower 67 rotatably secured on the middle portion of the connecting bar 59. The cam 64 is mounted to the output shaft of the motor 62 so that the largest radius of the cam 64 has a phase difference of 90° relative to a position of the recess 63a of the cam 63. Thus, when the actuator 65a of the limit switch 65 is in a position corresponding to the recess 63a (i.e., an OFF signal is issued), the rod 60 is moved to the uppermost position at which the roller 61 is engageable with the lever 50, and when the actuator 66a of the other switch 66 is in a position corresponding to the recess 63a, the rod 60 is moved to the lowermost position at which the roller 61 is in a withdrawn position.

A first station 68 is disposed in the inlet area of the roving process, for receiving information from the tractor 14 about whether or not the tractor is accompanied by a carrier 7, and which kind of empty bobbins for A or B are suspended from the carrier 7, and inputting the same to a central control unit 71 supervising the operation of the roving bobbin transporting system. The station 68 also transmits a command prepared by the central control unit 71 to the tractor 14, indicating the particular roving frame to be visited by the tractor 14 and the kind of operation to be carried out in the roving frame, i.e., the entry or removal of the carrier 7. Further, in the inlet area of the spinning process, a second station 69 is disposed for receiving information from the tractor 14 about whether or not the tractor 14 is accompanied by a carrier 7, and which kind of full bobbins for A or B are suspended from the carrier 7, and inputting the same to the central control unit 71. The station 69 also transmits a command prepared by the central control unit 71 to the tractor 14, indicating the particular spinning frame to be visited by the tractor 14, an identification of the working rail 5 (R or L), and the kind of operation. Further, a third station 70 is disposed, in the inlet area of the residual roving clear-off process, for receiving information from the tractor 14 about whether or not the tractor 14 is accompanied by a carrier 7, and which kind of residual roving for A or B are wound on the bobbin suspended from the carrier 7, and inputting the same to the central control unit 71. The station 70 also transmits a command prepared by the central control unit 71 to the tractor 14, indicating the particular working rail 6 for residual roving clear-off process to be visited by the tractor, and the kind of operation.

The central control unit 71 also receives information regarding the condition of the respective processes from each frame and device, i.e., of stating which frame requires the entry or removal of a carrier of carrying what kind of roving bobbins. The central control unit 71 determines the priority of frames to be visited by the tractor 14 in accordance with the above information from the respective processes and the respective stations 68, 69 and 70, and issues the same to the stations 68, 69 and 70. The station, in turn, transmit the same to a tractor 14 passing thereby.

The operation of the above system will be described below.

The tractor 14 runs, with or without the carrier 7, on the main rail 3 in the predetermined direction, as shown in FIG. 1, from the roving process to the spinning process, from the spinning process to the residual roving clear-off process, and from the residual roving clear-off process to the spinning process. When reaching a position corresponding to the station 68 disposed in the inlet area of the roving process, the tractor 14 is made to stop at this position. The station 68 receives the information regarding the tractor 14 and transmits the same to the central control unit 71. Then the unit 71 issues a command, in accordance with the information from the tractor 14 and from the roving process, to the station 68, which command is transmitted to the tractor 14, indicating the address of the roving frame where the tractor 14 is to go and the kind of operation (if the tractor 14 is accompanied by a carrier 7, the entry thereof to the roving frame). The tractor 14 starts again after memorizing the command, and continues to run while detecting the dogs 28 for representing the frame address, by the sensors 34, 35. When the sensors 34, 35 have detected the target frame address, the counting operation for the dogs 33 for representing the distance is commenced by the sensors 36a, 36b. When the predetermined count number is reached, the tractor 14 is made to stop. At this moment, the tail end of the carrier 7 is at a position just past the division point between the main rail 3 and the working rail. From the division point, the carrier 7 is moved onto the working rail 4 as the tractor 14 moves backward, as stated later. The counting of the dog 33 is commenced after the sensor has detected the dog 28 representing the frame address. It should be noted that every counting operation is completed by two steps. Namely, after the preceding sensor 36a has detected the dog 33, the succeeding sensor 36b must detect the same dog 33. Therefore, as shown in FIG. 13, the dog 33 positioned directly adjacent to the dog 28 is detected by the sensor 36b but is not detected by the sensor 36a, whereby this dog 33 is not counted. If only one dog 33 is arranged on a certain section of the main rail 3, the distance thereof may not be measured due to the above mode of operation. But, since the dogs 33 are arranged at a pitch of less than half a minimum distance between the adjacent division points of the main rail 3 and the working rail, at least two dogs 33 are provided between every adjacent division point, whereby the distance therebetween can be always detected by the sensors 36a and 36b. According to this structure, when the tractor 14 has stopped after detecting the predetermined number of dogs 33, the tail end of the carrier 7 is positioned between the target working rail 4 and the subsequent working rail 4.

When the tractor 14 and the carrier 7 pass by the division point between the main rail 3 and the every working rails, the lever 41 of the switching mechanism 37 is engaged with the roller 16 of the tractor 14 and pivoted counter-clockwise, as the tractor 14 is displaced forward, from the position illustrated by a chain line in FIG. 7 to the position illustrated by a solid line, against the biasing force caused by the spring 44. Since the distance between the adjacent rollers 9, 16 or 21 is defined so that the lever 41 is simultaneously engageable with the two adjacent rollers, the lever 41 is kept in the admittance position shown by a sold line in FIG. 7 once the lever is in this position, until the lever 41 is disengaged from the last roller 9 of the carrier 14 or the lever 41 is disengaged from the frontmost roller 16 when the tractor 14 moves backward. Thus, when the tractor 14 has stopped while the tail end portion of the carrier 7 passes by the division point between the main rail 3 and the working rail 4 requiring the entry of the carrier 7, the lever 41 of the switching mechanism 37 arranged in the division point is pivoted clockwise in FIG. 7 by the action of the spring 44 and maintained in the admittance position shown by a chain line. The lever 41 of the switching mechanism 37 arranged in the division point between the main rail 3 and the working rail 4 or 5 positioned subsequent to the aforesaid working rail 4, which lever 41 is engaged with the rollers 16, 21 and/or 9 of the tractor 14, connector 22 and/or carrier 7, is maintained in the position shown by a solid line in FIG. 7 until the same is disengaged from the respective rollers.

Figure 14D:
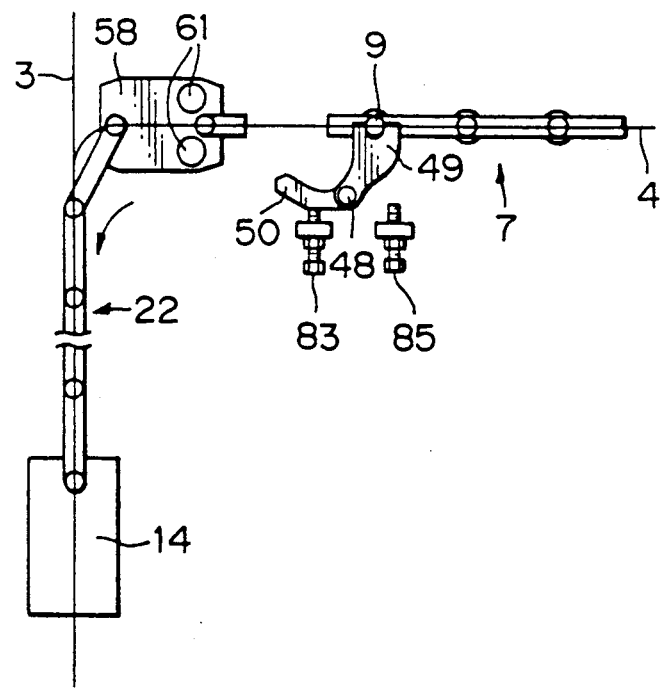

Under these conditions, the tractor 14 moves backward while again counting the dogs 33, whereby the carrier 7 and the connector 22 are moved onto the working rail 4 arranged in front of the roving frame as illustrated in FIG. 14(a). At the initial stage of the entry of the carrier 7, the positioning lever 49 of the releasing device 46 is withdrawn and the releasing lever 52 is engaged with the projection 55b of the actuating lever 55 and maintained in the withdrawn position so as not to hinder the passage of the roller 9. Thus, the carrier 7 is smoothly moved onto the working rail 4 as the tractor 14 moves backward. At that time, the roller 61 is maintained in a withdrawn position where the roller 61 is not engageable with the lever 50, whereby the roller 61 passes under the lever 50 as shown in FIG. 14(b). After the predetermined number of dogs 33 are counted, the tractor 14 continues to run at a slow rate, due to its own inertia, and is braked to a stop after the sensor 35 detects the dog 30. At this moment, the roller 61 coincides with the lever 50. Under such conditions, the geared motor 62 is energized to drive the cam 64, and the rollers 61 move upward together with the rods 60 through the cam follower 67 and connecting bar 59, to a position engageable with the lever 50. Thereafter, the tractor 14 moves forward. The roller 61 is engaged with the lever 50 according to the forward movement of the tractor 14, which lever, in turn, pivots counter-clockwise from the position shown in FIG. 14(c) as the tractor 14 moves further forward, whereby the positioning lever 49 also pivots counter-clockwise. Since the connection between the connector 22 and the carrier 7 is not yet released at this stage, the carrier 7 moves together with the connector 22. Thus, the distance between the roller 61 and the roller 9 arranged at the tail end of the carrier 7 is maintained constant. When the connector 22 moves to a position where the roller 61 is released from the lever 50, the recess 49a of the positioning lever 49 is engaged with the roller 9 provided at the tail end of the carrier 7. At this stage, the engagement of the releasing lever 52 with the projection 55b of the actuating lever 55 is released, whereby the releasing lever 52 is pivoted downward under its own weight and is engaged with the hook 13 provided at the rear portion of the carrier 7 so that the hook 13 is released from the pin 23 of the connector 22. Then, as shown in FIGS. 14(d) and 12(a), the carrier 7 is detached from the connector 7 and remains on the working rail 4. Thus the entry of the carrier 7 by the tractor 14 is completed. On the other hand, the tractor 14 moves toward the spinning process together with the connector 22.

Figure 12B:
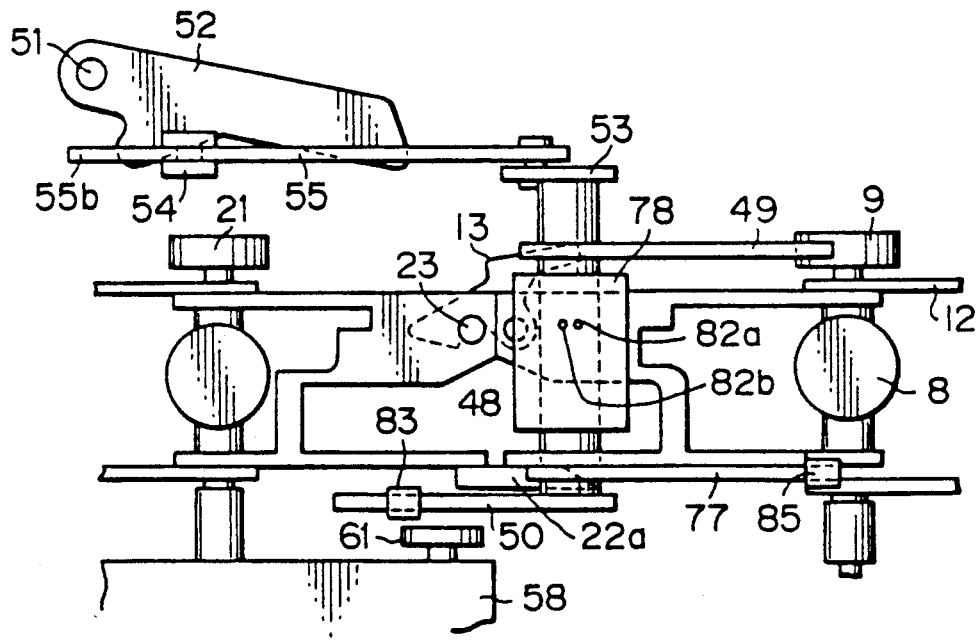
Figure 15A:
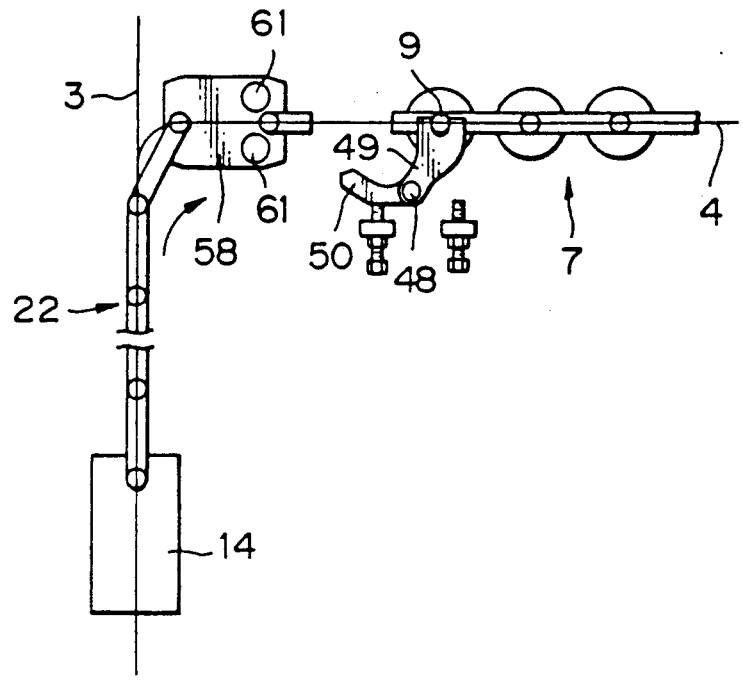
FIGS. 15(a) to 15(d) are diagrammatic plan views illustrating the steps for moving the carrier off of a working rail for a roving frame, respectively.
Figure 15B:
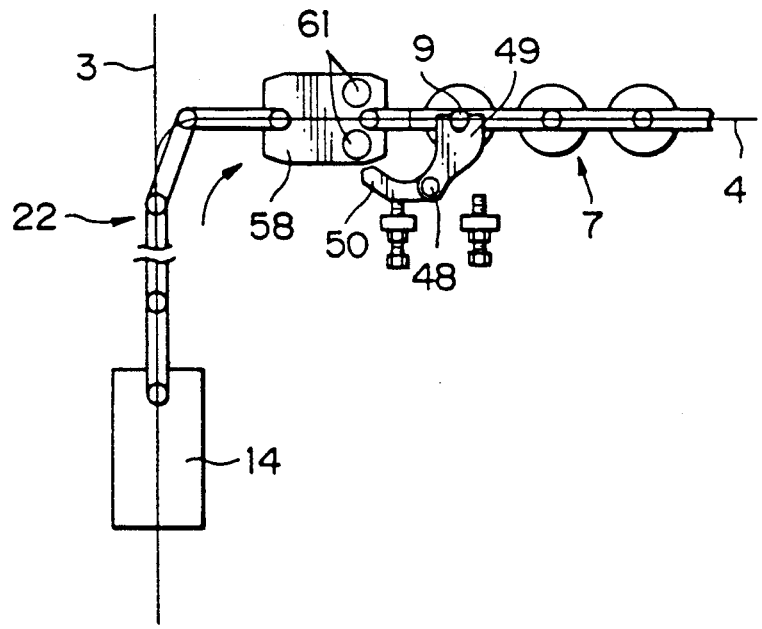
Figure 15C:
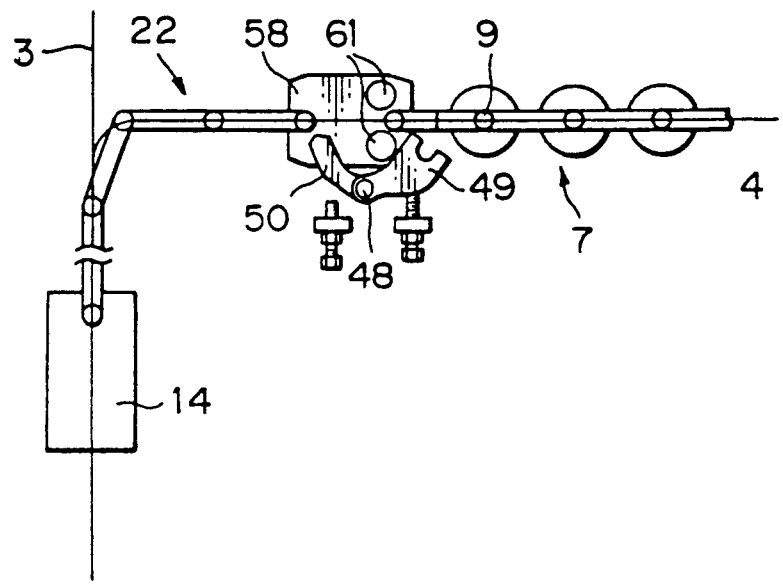
Figure 15D:
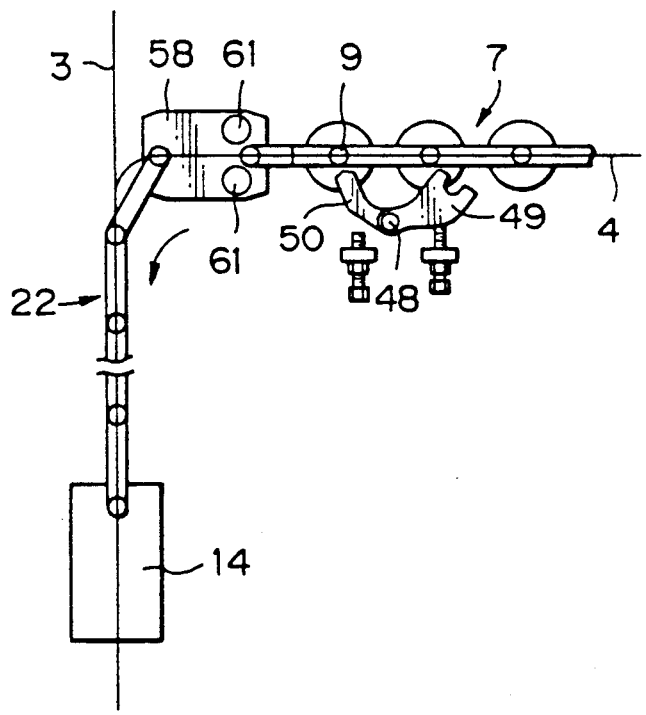

When the carrier 7 is moved of off the working rail 4 for the roving frame, the tractor 14 moves forward until the predetermined number of dogs 33 are counted after the tractor 14 has detected the dog 28 for representing the roving frame address. Note, the number of dogs 33 to be counted is less than that counted when entering the carrier 7, because the tractor 14 is not accompanied by the carrier 7 thereafter. Then the tractor 14 is made to stop and moves backward while again counting the dogs 33 so that the connector 22 is moved onto the working rail 4 as shown in FIG. 15(a). The backward movement of the tractor 14 is further continued after the tail end of the connector 22 abuts the front end of the carrier 7 so that the carrier 7 is displaced further in the right hand direction from a position shown in FIG. 15(b), i.e., farther down the working rail 4. Thus, the positioning lever 49 is made to rotate clockwise to release the engagement of the recess 49a with the roller 9, as shown in FIGS. 15(c) and 12(b). The tractor 14 is made to stop after the address sensor 35 has detected the dog 30 for representing the stop position. When the positioning lever 49 rotates clockwise, the lever 55 moves via the lever 53 so that the projection 55b abuts the lever 52 to rotate the same upward and release the engagement of the lever 52 with the hook 13. Thus, the lever 52 is in the withdrawn position allowing the passage of the roller 9 of the carrier 7, as shown in FIG. 12(b). The hook 13 is engaged with the pin 23 of the connector 22 so that the carrier 7 is connected to the connector 22. Thereafter, the carrier 7 is moved of off the working rail 4 by the forward movement of the tractor 14 and transported to the spinning process.

The entry and removal of the carrier 7 in the spinning process are similar to those in the roving process described above. But, to carry out the roving exchanging operation disclosed in DE 35 37727 A1, the first embodiment of the present invention has a specific construction. That is, according to this roving exchanging operation, the roving bobbins are arranged on a creel of a spinning frame in front and rear rows. Each row has two kinds of roving bobbins, a larger size bobbin and a smaller size bobbin, arranged in an alternate manner, while the same kind bobbin in one row is adjacent to that in the other row. As the spinning operation continues, the rovings on the respective bobbins are exhausted and the smaller size bobbin becomes almost empty. At this stage, the roving exchanging operation is carried out sequentially, by one pair to one pair of empty bobbins on the front and rear rows, so that half of the roving bobbins on the creel are replaced by fresh full bobbins. Thus, these full bobbins become new larger size bobbins, and in turn, the old larger size bobbins become new smaller size bobbins. Therefore, the next roving exchanging operation must be carried out on the roving bobbins shifted by one pitch. Corresponding thereto, according to the first embodiment of the present invention, the respective working rail 5 for reserving a roving bobbin has two releasing devices 46 in the inlet area thereof, each of which is positioned at a distance from the other identical to one pitch of the bobbin arrangement on the creel, so that the tractor 14 can select either of the releasing devices 46 when the connection between the connector 22 and the carrier 7 is detached. Accordingly, the tractor 14 is made to stop in front of a station 69 provided in the inlet area of the spinning process and receive information about which spinning frame 2 and which side working rail 5 requires the entry or removal operation, and which releasing device 46 is to be selected. Thereafter, the tractor 14 moves to and stops at a predetermined position.

The entry and removal of the carrier 7 to and from the residual roving clear-off process are carried out in the following manner.

Figure 16A:
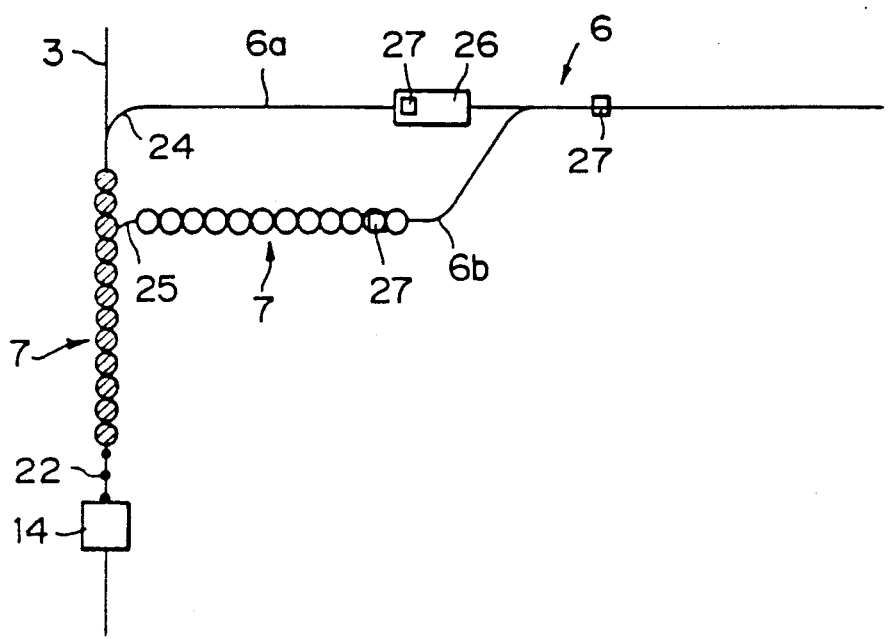
FIGS. 16(a) to 16(e) are diagrammatic plan views illustrating the steps for moving the carrier on and off a working rail for a residual roving clear-off processes, respectively.
Figure 16B:
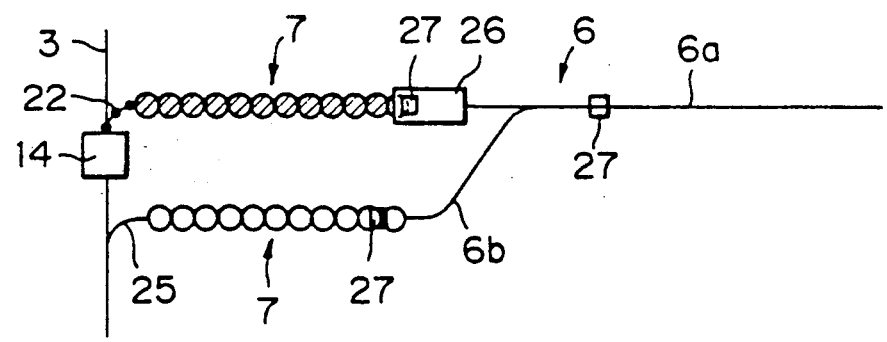
Figure 16C:
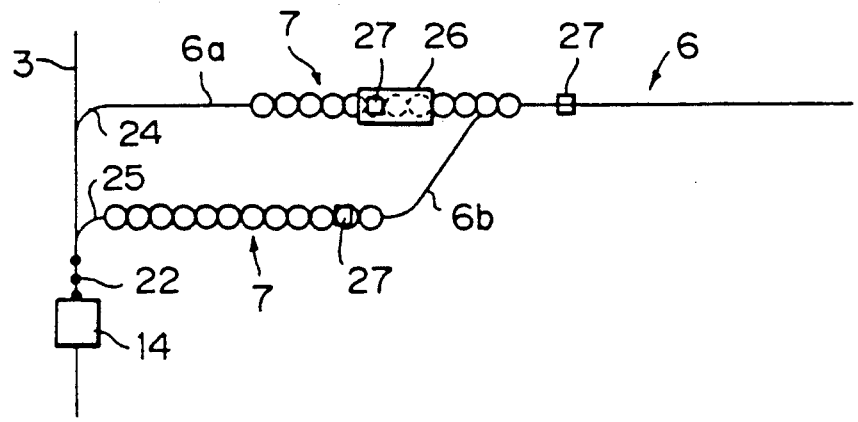

The tractor 14 accompanied by the carrier 7 having the exhausted roving bobbins suspended therefrom is made to stop at a position corresponding to a station 70, at which the tractor 14 is given the address of the working rail 6 requiring the clearing-off operation of the residual roving. The tractor 14 is moved forward by a predetermined distance after the address sensors 34, 35 detect the dog 29 representing the address of the target working rail 6 (FIG. 16(a)). Then the tractor 14 is moved backward, whereby the carrier 7 and the connector 22 are moved onto an entry rail 6a, as shown in FIG. 16(b). After the connection between the connector 22 and the carrier 7 is released by the releasing device 46, a residual roving clear-off device 26 is actuated to clear off the residual roving on the bobbin as the carrier 7 is moved farther along the entry rail 6a by a carrier driving device 27, as shown in FIG. 16(c). On the other hand, the tractor 14, which have completed the entry of the carrier 7, is moved forward along the main rail 3 to a position past the outlet 25, as shown in FIG. 16(c), and moved backward to move the connector 22 onto a removal rail 6b through the outlet 25, to remove another carrier 7 waiting on the removal rail 6b after the completion of the clear-off operation. When moved onto the removal rail 6b, the connector 22 is again engaged automatically with the waiting carrier 7. Thereafter, the tractor 14 is moved forward, accompanied by the carrier 7 having the empty bobbins suspended therefrom, toward he roving process.

Figure 16D:
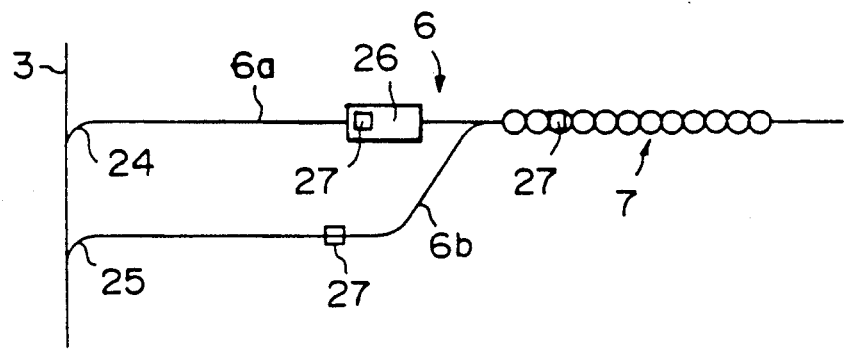
Figure 16E:
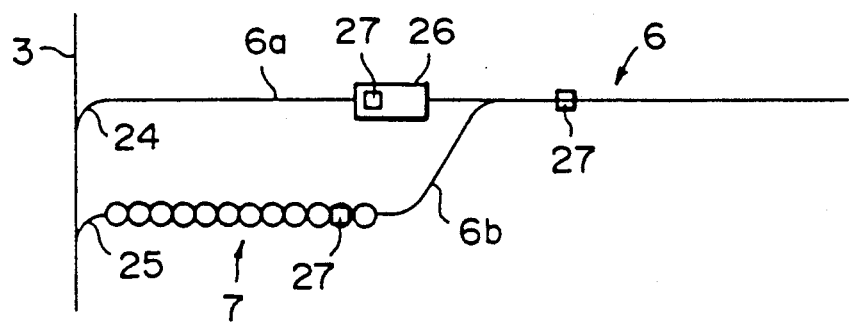

The carrier 7 cleared off by the residual roving clear-off device 26 is driven backward by another carrier driving device 27 provided in the inner area of the entry rail 6a so that the front end of the carrier 7 (the left-hand end thereof in FIG. 16) is past the division point between the entry rail 6a and the removal rail 6b as shown in FIG. 16(d). Then the carrier 7 is driven forward by the abovesaid carrier driving device 27 as well as by a further carrier driving device 27 provided on the removal rail 6b, to be moved onto the removal rail 6b, as shown in FIG. 16(e), and held there until the next tractor 14 is in contact therewith. If the clear-off operation on the preceding carrier 7 has not been completed and the working rail 6 is in the condition as shown in FIGS. 16(a) through 16(c) when the tractor 14 accompanied by the next carrier 7 having the residual roving bobbins suspended therefrom reaches the rail 6, the tractor 14 waits on the main rail 3 a little before the inlet 24 of the working rail 6 until the residual roving clear-off operation is completed, and immediately thereafter, carries out the entry of the carrier 7. Then the tractor 14 removes the carrier 7 having the empty bobbins suspended therefrom from the removal rail 6b.

According to the above operational system, the tractor 14 runs on the main rail 3 and enters or removes the carrier 7 in a random manner when an operational command is issued by the control unit. Another operational system has been proposed by the present applicant, in which the tractor 14 is required to carry out either of the entry or removal operation in the respective processes of roving, spinning, and residual roving clearing-off. If three tractors 14 are used in this system, the operational diagram of the respective processes is as shown in FIG. 18(a). That is, a tractor No. 1 removing the carrier 7 in the roving process enters the carrier 7 in the spinning process, and removes same in the residual clear-off process. A tractor No. 2 following the No. 1 carries out the entry in the roving process, the removal in the spinning process, and the entry in the residual roving clear-off process. A tractor No. 3 following No. 2 carries out the removal in the roving process, the entry in the spinning process, and the removal in the residual roving clear-off process. In other words, the respective tractor 14 runs along the main rail 3 while alternately carrying out the removal and the entry in the subsequent process.

When an odd number of tractors 14 is used in the system, such as three, no problems occur in the system because the removal and entry is carried out alternately in the respective process without interruption. While, if the number of the tractor 14 is an even number such as four, the alternation of the entry and removal in the respective processes is interrupted by the repetition of the identical operation by the tractors No. 1 and No. 4 as shown in FIG. 18(b). According to the present invention, since at least two frames are provided in the roving and spinning processes for producing the respective type yarns, the above repetition of the identical operation causes no substantial problems. Conversely, in the residual roving clear-off process, since only one residual roving clear-off device 26 is provided for treating the respective type roving, the repetition of the identical operation causes the system to cease functioning, if the working rail 6 has a structure similar to that of the other working rails 4 or 5. But, according to this embodiment of the present invention, the working rail 6 for clearing off the residual roving comprises the entry rail 6a and the exit rail 6b branched from the former, whereby the above problem is solved. Namely, if the entry is repeated, the tractor 14 may move a new carrier 7 onto the entry rail 6a while the preceding carrier 7 is waiting on the exit rail 6b after the completion of the clear-off operation by the residual roving clear-off device 26. On the other hand, if the removal is repeated, the tractor 14 may wait on the main rail 3 until the clear-off operation for the carrier 7 moved onto the working rail 6 has been completed, and remove the carrier 7 after the same is moved onto the removal rail 6b.

Second Embodiment

An alternative embodiment will be explained, with reference to FIGS. 19 through 22, which is suitable for a spinning system in which the number of roving bobbins doffed from one roving frame does not correspond to that of roving bobbins to be introduced to a creel of a spinning frame. For example, when 120 roving bobbins are doffed from one roving frame and 96 roving bobbins are to be introduced to a creel of one spinning frame in the bobbin exchanging operation (i.e., the spinning frame has 192 spindles on each side thereof, and a half thereof are exchanged at one time).

As shown in FIG. 20, a carrier 7 to be moved onto a working rail 4 for reserving roving bobbins comprises five units 72, each able to suspend 24 roving bobbins therefrom. The respective unit 72 is provided, at the front end thereof, with a hook (not shown) similar to the hook 13 for the connection with the connector 22 or with the other unit 72, and at the rear end thereof, with a pin (not shown) similar to the pin 23.

As shown in FIG. 19, a pair of working rails 73 are provided in parallel to each other between a group of spinning frames 1 and a group of roving frames 2, and branched from the main rail 3. The respective rail 73 corresponds to a yarn type produced in this spinning system. The rail 73 modifies the number of units 72 of the carrier 7 removed from the working rail 4 to match the number of units 72 to be moved onto the working rail 5. Similarly, a pair of rails 74 are provided between a residual roving clear-off process and the roving process, which modify the number of units 72 of the carrier 7 removed from the working rail 6 after clearing up the residual roving to match the number of units 72 to be moved onto the working rail 4. The respective rails 73 and 74 have a releasing device 75 with a driving means therein in the inlet area thereof. The releasing device 75 has the same structure as the releasing device 46 except for the provision of the abovesaid driving means (not shown) for driving the lever 50. A station 76 is provided in the inlet area of the empty bobbin rearranging process, for receiving information from the tractor 14 and issues a command to the tractor 14 about which rail requires the entry or removal of the carrier 7. The stations 68, 69, 70 and 76 have control units 68a, 69a, 70a and 76a, respectively, for receiving information about the process and tractor and issuing a command to the tractor 14 through the stations.

In this roving bobbin transporting system, the working rail 5 receives the carrier 7 consisting of four unit 72 and the working rail 4 receives the carrier 7 consisting of five units 72. When the carrier 7 consisting of five units 72 removed from the working rail 4 is rearranged to be four units 72 to be moved onto the working rail 5, after removing the carrier 7 from the roving frame indicating by the command issued from the station 68, as shown in FIG. 21(a), the tractor 14 is made to stop at a position in which the tail end of the carrier 7 is just past the division point between the rail 73 and the main rail 3. Then, the tractor 14 moves backward until the last unit 72 has been moved onto the rail 73, as shown in FIG. 21(a). At this stage, the releasing device 75 is actuated to detach the last unit 72 from the preceding ones. Then the tractor 14 moves forward, accompanied by the carrier 7 consisting of four units 72, toward the spinning process, as shown in FIG. 21(b). The same operation is repeated when the carrier 7 is removed from the working rail 4 until four units 72 are held on the rail 73. When four units 72 are held on the rail 73, the station 68 issues a command to the tractor 14 to remove the carrier 7 consisting of the reserved units 72 from the rail 73 even though another roving frame 1 requires a removal of the carrier 7 from the working rail 4. According to this command, the tractor 14 not accompanied by a carrier 7 reaches the rail 73 and removes the carrier 7 of four units 72 and takes it to the spinning process, as shown in FIGS. 21(c) and 21(d).

On the other hand, when the carrier 7 removed from the working rail 6 and consisting of four units 72 is rearranged to be five units 7, the tractor 14 accompanied by the carrier 7 consisting of four units, each having empty bobbins suspended therefrom, moves the carrier 7 onto the rail 74 as shown in FIG. 22(a). Then the carrier 7 is detached from the connector 22 by the releasing device 75 and the tractor 14 moves forward to the roving process without a carrier 7, as shown in FIG. 22(b). Next, another tractor 14 accompanied by a carrier 7 consisting of four units 72 having the empty bobbins suspended therefrom reaches the rail 74, moves the last unit 72 onto the rail 74, and connects the same with the carrier 7 waiting on the rail 74, as shown in FIG. 22(c). Thereafter, the tractor 14 moves forward so that the connection between the fourth and fifth units is released by the releasing device 75, and thus the connection is released and the three units 72 remain on the rail 74 after the tractor 14 is moved forward to the roving process. A similar operation is repeated until no reserved unit 72 remains on the rail 74. When the last reserved unit 72 is moved, a next tractor 14 moves the carrier 7 consisting of four units onto the rail 74 for the next series of operations.

It should be noted that the present invention is not limited to the abovesaid two embodiments. For example, the means for representing the frame address and the working rail address may be a lamp which is detected by a photo sensor provided on the tractor. A pair of sensors 36a, 36b for detecting dogs 33 for representing a distance may be replaced by one sensor. Further, the distance between the adjacent dogs 33 may be widened. In addition, the working rail 4, 5 or 6 may be completely separated from the main rail 3 when no entry or removal operation is carried out, and both rails may be connected by a bridge mounted on the tractor when an entry or removal operation is carried out, as disclosed in Japanese Unexamined Patent Publication No. 62-110928.

We claim:

1. A system for transporting roving bobbins in a cyclic manner between a roving process and a spinning process, in which the roving bobbins are transported, while suspended from a carrier, along a main rail arranged to form in endless loop and working rails branched from the main rail, the working rails comprising a roving frame rail and a spinning frame rail the improvement comprising—said carrier comprising a plurality of support members, connected to each other, each support member comprising a bobbin hanger suspended from the bottom of the support member, said carrier having a means for detachable connection with a tractor having detachable connection means at a back end thereof for detachable connection with the carrier, the tractor movable along the main rail, means disposed on the main rail for representing the respective working rail address, which are detected by a sensor mounted on the tractor; and a station, disposed at least in the inlet area of the roving and spinning processes, respectively, said station transmitting a command when the tractor reaches a position corresponding to the station, the command issued from a central control unit supervising the system to the tractor, said command being prepared in accordance with information regarding the conditions of the tractor and of the respective frames and working rails and said command also including information regarding the working rail address requiring transportation of a carrier.

2. A system as defined in claim 1, wherein the carrier is moved onto and off of the working rail, respectively, by the backward and forward movements of the tractor along the main rail.

3. A system as defined in claim 2, wherein the backward and forward movements of the tractor are controlled so that the tractor runs a predetermined distance from a division point between the main rail and the working rail, said distance being defined by address dogs arranged at a pitch on the main rail.

4. A system as defined in claim 1 or 2, wherein the tractor carries out either of the entry or the removal of the carrier at the working rail only once each time the respective processes are passed.

5. A system as defined in claim 1 or 2, wherein said residual roving clear-off rail comprises a pair of rails; an entry rail and an exit rail; said entry rail having an inlet opening to the main rail for moving the carrier thereonto and said exit rail having an outlet opening to the main rail for removing the carrier therefrom, whereby the carrier suspending empty roving bobbins which have been cleared off the residual roving can be held on the exit rail without hindering the movement of another carrier onto the entry rail.

* * * * *